US010311196B1

(12) United States Patent
Lewis

(10) Patent No.: US 10,311,196 B1
(45) Date of Patent: Jun. 4, 2019

(54) METHOD AND APPARATUS FOR PERFORMING SYMBOLIC TIMING ANALYSIS WITH SPATIAL VARIATION

(71) Applicant: Altera Corporation, San Jose, CA (US)

(72) Inventor: David Lewis, Toronto (CA)

(73) Assignee: Altera Corporation, San Jose, CA (US)

( * ) Notice: Subject to any disclaimer, the term of this patent is extended or adjusted under 35 U.S.C. 154(b) by 33 days.

(21) Appl. No.: 15/043,432

(22) Filed: Feb. 12, 2016

(51) Int. Cl.
*G06F 17/50* (2006.01)
(52) U.S. Cl.
CPC ...... *G06F 17/5081* (2013.01); *G06F 17/5054* (2013.01); *G06F 17/5072* (2013.01)
(58) Field of Classification Search
CPC ............. G06F 17/5031; G06F 2217/84; G06F 17/5081; G06F 17/5054; G06F 17/5072
See application file for complete search history.

(56) References Cited

U.S. PATENT DOCUMENTS

| 6,901,571 | B1* | 5/2005 | Petranovic | G06F 17/5072 716/113 |
| 7,853,911 | B1* | 12/2010 | Fung | G06F 17/5054 716/113 |
| 8,176,461 | B1* | 5/2012 | Trimberger | G06F 17/5036 703/19 |
| 2011/0010141 | A1* | 1/2011 | Jabir | G06F 17/5045 703/2 |
| 2011/0035714 | A1* | 2/2011 | Foreman | G06F 17/5031 716/108 |

* cited by examiner

*Primary Examiner* — Vuthe Siek
(74) *Attorney, Agent, or Firm* — Compass IP Law PC

(57) ABSTRACT

A method for designing a system on a target device includes placing the system on the target device. Timing analysis is performed on the placed system to model delays by using a plurality of localized functions that overlap.

23 Claims, 17 Drawing Sheets

Simple gate level circuit

Timing graph

METHOD AND APPARATUS FOR PERFORMING SYMBOLIC TIMING ANALYSIS WITH SPATIAL VARIATION

FIELD

Embodiments of the present disclosure relate to tools for designing systems on target devices. More specifically, embodiments of the present disclosure relate to a method and apparatus for performing symbolic timing analysis with spatial variation.

BACKGROUND

Target devices such as field programmable gate arrays (FPGAs), structured application specific integrated circuits (ASICs), and ASICs are used to implement large systems that may include million of gates and megabits of embedded memory. The complexity of a large system often requires the use of electronic design automation (EDA) tools to create and optimize a design for the system onto physical target devices. Among the procedures performed by EDA tools in a computer aided design (CAD) compilation flow is hardware description language (HDL) compilation. HDL compilation involves performing synthesis, placement, routing, and timing analysis of the system on the target device.

Static timing analysis is one approach that may be used to analyze timing of a system on a target device where an expected timing of a digital circuit is computed without requiring the simulation of the full circuit. Static timing analysis may be performed for more than one set of conditions in order to qualify a design across many conditions. If the design operates at each extreme condition, then under the assumption of monatomic behavior, the design should also be qualified for all intermediate points.

SUMMARY

Embodiments of the present disclosure provide a timing analysis of systems implemented on target devices, such as integrated circuits. Variation on a die may be modeled such that elements located near each other are modeled having similar delays. Variation on the die may be modeled as a set of process variables. The delay of each circuit element may be modeled as a polynomial in the process variables. The polynomial may model a contribution of a process variation across the die for each circuit element. During timing analysis, a symbolic representation allows for the tracking of sources of on die process variation, which provides for improved accuracy.

A method for designing a system on a target device includes placing the system on the target device. Timing analysis is performed on the placed system to model delays by using a plurality of localized functions that overlap. The localized functions represent an influence that affects a delay for an area on the target device that is a proper subset of a total area of the target device. The influence may relate to one or more of process, temperature, and voltage variation.

BRIEF DESCRIPTION OF THE DRAWINGS

The features and advantages of embodiments of the present disclosure are illustrated by way of example and are not intended to limit the scope of the embodiments of the present disclosure to the particular embodiments shown.

FIGS. 19A-19B illustrate exemplary tables of data according to embodiments of the present disclosure.

FIGS. 20A-20D illustrate exemplary tables of data according to embodiments of the present disclosure.

DETAILED DESCRIPTION

In the following description, for purposes of explanation, specific nomenclature is set forth to provide a thorough understanding of embodiments of the present disclosure. It will be apparent to one skilled in the art that specific details in the description may not be required to practice the embodiments of the present disclosure. In other instances, well-known circuits, devices, procedures, and programs are shown in block diagram form to avoid obscuring embodiments of the present disclosure unnecessarily.

Figure 1:
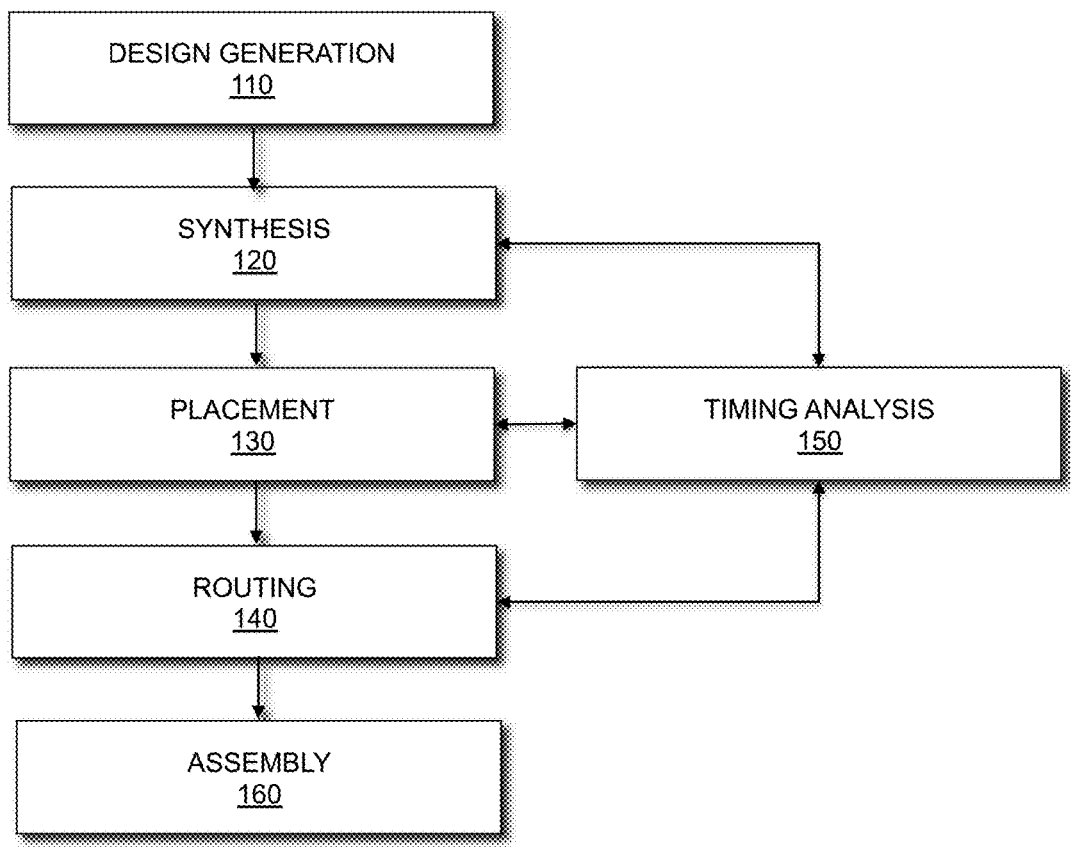
FIG. 1 is a flow chart illustrating a method for designing a system on a target device according to an exemplary embodiment of the present disclosure.

FIG. 1 is a flow chart illustrating a method for designing a system on a target device according to an exemplary embodiment of the present disclosure. The target device may be a field programmable gate array (FPGA), application specific integrated circuit (ASIC), a structured ASIC, or other device whose functionality is described by a hardware description language (HDL). At 110, a design for the system is generated. According to an embodiment of the present disclosure, the design is generated in response to input provided by a user. In this embodiment, the user may input a register-transfer-level (RTL) description of the system, select and connect logic from a library, or utilize other design input options. The design for the system generated may be in HDL and may include a plurality of reconfigurable logic blocks.

At 120, the system is synthesized and a netlist is generated. Synthesis includes generating a logic design of the system to be implemented by the target device. According to an embodiment of the present disclosure, synthesis generates an optimized logical representation of the system from an HDL design definition. Synthesis also includes mapping the optimized logic design. Mapping includes determining how to implement logic gates and logic elements in the optimized logic representation with specific resources on the target device such as logic elements and functional blocks. According to an embodiment of the present disclosure, a logic netlist is generated from mapping during synthesis. This netlist may be an optimized technology-mapped netlist generated from the HDL. The logic netlist may identify resources utilized in a target and interconnections between ports of the resources.

At 130, the system is placed. According to an embodiment of the present disclosure, placement involves placing the mapped logical system design on the target device. Placement works on the technology-mapped netlist to produce a placement for each of the logic elements and functional blocks. According to an embodiment of the present disclosure, placement includes fitting the system on the target device by determining which resources on the target device are to be used to implement the logic elements and functional blocks identified during synthesis. Placement may include clustering which involves grouping logic elements together to form the logic clusters present on the target device. According to an embodiment of the present disclosure, clustering is performed at an early stage of placement and occurs after synthesis during the placement preparation stage. Placement may also minimize the distance between interconnected resources to meet timing constraints of the timing netlist.

At 140, the placed design is routed. During routing, routing resources on the target device are allocated to provide interconnections between logic gates, logic elements, and other components on the target device. According to an embodiment of the present disclosure, routing aims to reduce the amount of wiring used to connect components in the placed logic design. Routability may include performing fanout splitting, logic duplication, logical rewiring, or other procedures. It should be appreciated that one or more of the procedures may be performed on the placed logic design. Timing optimization may also be performed during routing to allocate routing resources to meet the timing constraints of the timing netlist.

At 150, timing analysis is performed on the system designed by procedures 120, 130, and 140. According to an embodiment of the present disclosure, the timing analysis determines whether timing constraints of the system are satisfied. As part of timing analysis, slack analysis may be performed. Timing analysis 150 may model variations on a die such that elements located near each other are modeled having similar delays. In one embodiment, a variation on the die may be modeled as a set of process variables. The delay of each circuit element may be modeled as a polynomial in the process variables. The polynomial may model a contribution of a process variation across the die for each circuit element. During timing analysis 150, a symbolic representation allows for the tracking of sources of on die process variation, which provides for improved accuracy. It should be appreciated that the timing analysis may be performed during and/or after each of the synthesis 120, placement 130, and routing procedures 140 to guide compiler optimizations.

At 160, an assembly procedure is performed. The assembly procedure involves creating a program file that includes information determined by the procedures described at 110, 120, 130, and 140. The program file may be a bit stream that may be used to program a target device. In the case of an ASIC, the program file may represent the physical layout of the circuit. According to an embodiment of the present disclosure, the procedures illustrated in FIG. 1 may be performed by an EDA tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium. The target device may be programmed with the data file. By programming the target with the data file, components on the target device are physically transformed to implement the system.

Referring back to block 150, it should be appreciated that timing analysis may used to determine the maximum operational speed of a circuit on the system and whether the timing of the circuit meets predetermined constraints. As the speed of circuits may vary across a die, timing analysis may utilize multiple corners (conditions) to reflect different delays that are possible due to environmental conditions as well as variation of delay within the die.

Variation of delay within a die may be attributed to conditions that are completely random, spatial, and global. Purely random variation may be an independent variation on a circuit element and that is not correlated with any other delay variable. Spatial variation refers to variation that causes physically proximate circuit elements to have similar variation in delay. Generally, a pair of circuit elements may have some delay variation that is correlated as a function of distance. For example, the pair of circuit elements may have a 100% correlation at a distance of 0, and 0 correlation beyond some distance such as 5 mm, and a smoothly varying correlation at intermediate distances. It may be found that the correlation of delay between the circuit elements has a long tail, where the correlation drops to a small value. In this example the correlation may be 10% at some distance such as 5 mm, but slowly drops to 0 at a long distance. In this example, it may be sufficiently accurate to model the correlation distance as that distance where it drops to a suitable small value, which would be 10%, and to ignore the correlation beyond some distance where it is sufficiently small. Global variation applies to all circuit elements in a die equally.

There may be multiple sources of spatial variation in delay. Process variation may be modeled as a single source of delay variation, or alternatively it may be decomposed into distinct sources such as threshold voltage or channel length variation. In addition to process variation, there may be temperature or voltage variation. Within process variation, there may be multiple sources of variation that are correlated across various distances. For example, wafer level variation may produce a gradient across the die with some slope that is close to constant across the die. Other process variables may have shorter correlation distances. In each case, there is a set of process variables with unknown values that affect the delay of the circuit elements, with the value of each variable being correlated over some range of distance. Timing analysis conventionally treats variation as bounds on the delay on each circuit element. In some cases, timing analysis may also track the specific set of circuit elements used in order to cancel out common components.

Figure 2:
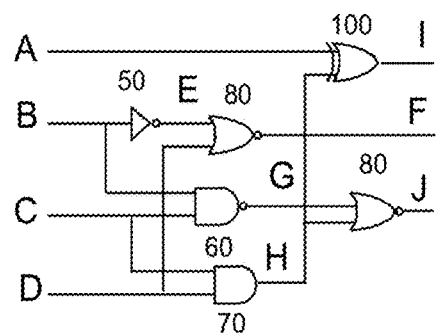
FIG. 2 illustrates an exemplary gate level circuit and an exemplary equivalent timing graph according to an exemplary embodiment of the present disclosure.
Figure 2:
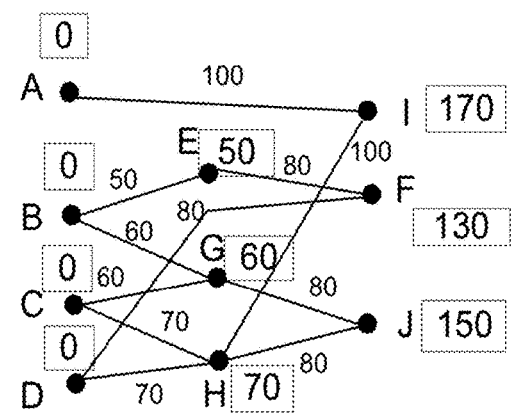

According to an embodiment of the present disclosure, timing analysis 150 uses a representation of the circuit delay referred to as a timing graph. FIG. 2 illustrates an exemplary gate level circuit on the left and an equivalent timing graph on the right according to an embodiment of the present disclosure. Each node in the timing graph represents a point in the digital circuit and its associated delay. Each edge in the timing graph represents the delay between a source node and a sink node. As shown in the exemplary simple gate level circuit, each logic gate corresponds to one or more edges representing the delay from its input(s) to output. It should be appreciated that other embodiments of the timing graph may be more complex and represent other sets of delays in the digital circuit, and the points at which they are measured. The timing graph may also represent the delay of routing elements or buffers. The minimum or maximum delay to a specific node in the graph is the minimum or maximum, respectively, of the delays to each of the nodes that fans into the node, plus the edge delay from the fanin node to the specified node. In the timing graph illustrated in FIG. 2, the delays are annotated on each edge, and the maximum delay to each node is shown in a rectangle. As shown, the gate level circuit has a maximum path delay of 170.

The critical path delay for a sequential circuit may be computed as the time for the source clock (Tsrc_clock), plus the time for the combinational logic delay (Tcomb), less the delay for the destination clock (Tdst_clk). The minimum possible clock cycle time may be represented with the following relationship. Tcyc=Tsrc_clk+Tcomb−Tdst_clk. To ensure that the worst case is computed, this would need to be Tsrc_clk(max)+Tcomb(max)−Tdst_clk(min). If there exists variation in any of the clock delay, the clock cycle must include an allowance for the min/max spread. In the presence of correlation, it is possible to know that the source clock (src_clk) and destination clock (dst_clk) may be physically proximate and the delay difference between them is decreased. Similarly part of the combinational logic may be close to the destination clock circuitry, which would result in having the variation partly cancel out.

Figure 3:
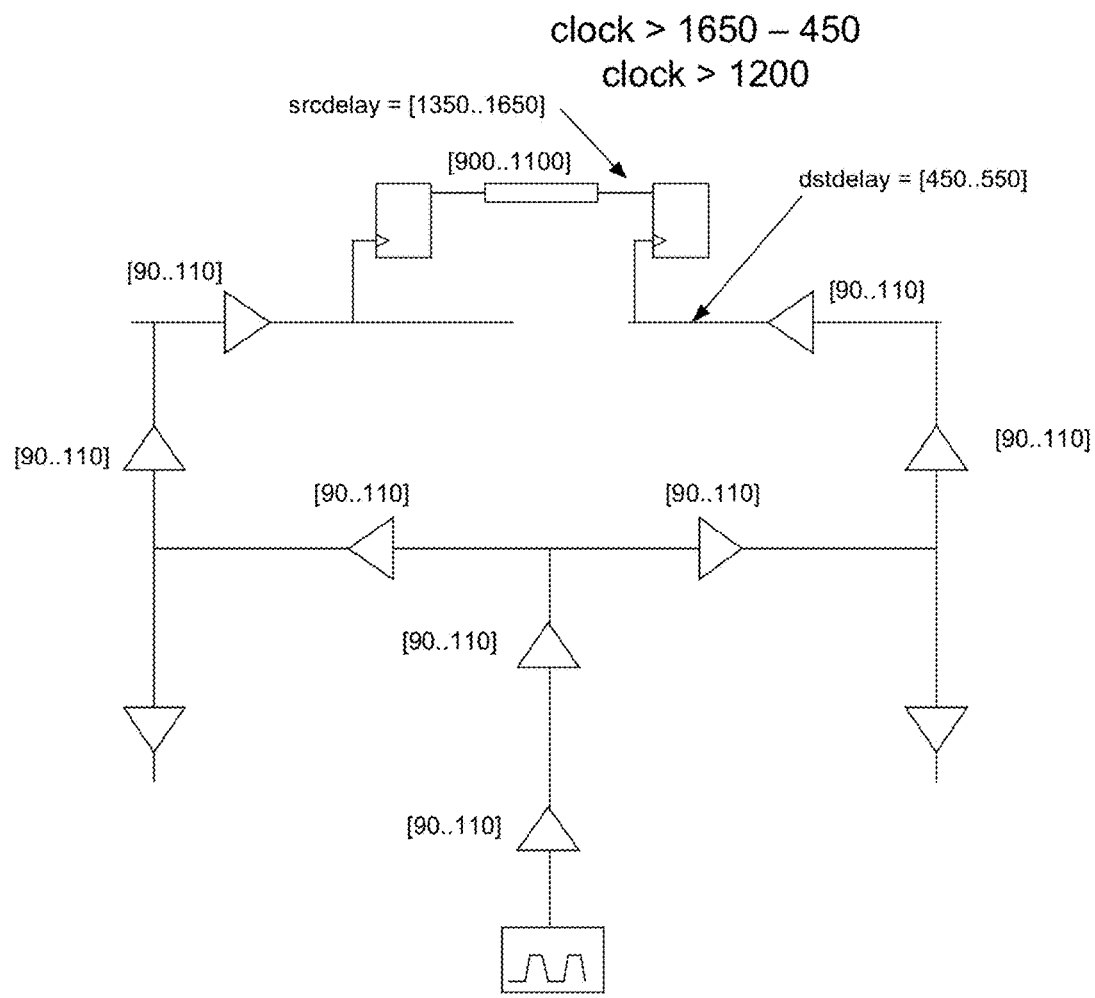
FIG. 3 is a diagram illustrating timing analysis with min/max delay according to an exemplary embodiment of the present disclosure.

FIG. 3 is a diagram illustrating timing analysis with min/max delay according to an exemplary embodiment of the present disclosure. FIG. 3 illustrates how delays may be extended to include min/max delays. The critical path of a clocked circuit is the maximum of the source path delays less the minimum of the destination path delays. In this example, each element has a 10% variation. The logic path has a delay of [900 . . . 1100]. However, the clock uncertainty causes the minimum clock cycle to be 1200 to account for the extra 50 units of uncertainty on each of the source and destination paths.

Figure 4:
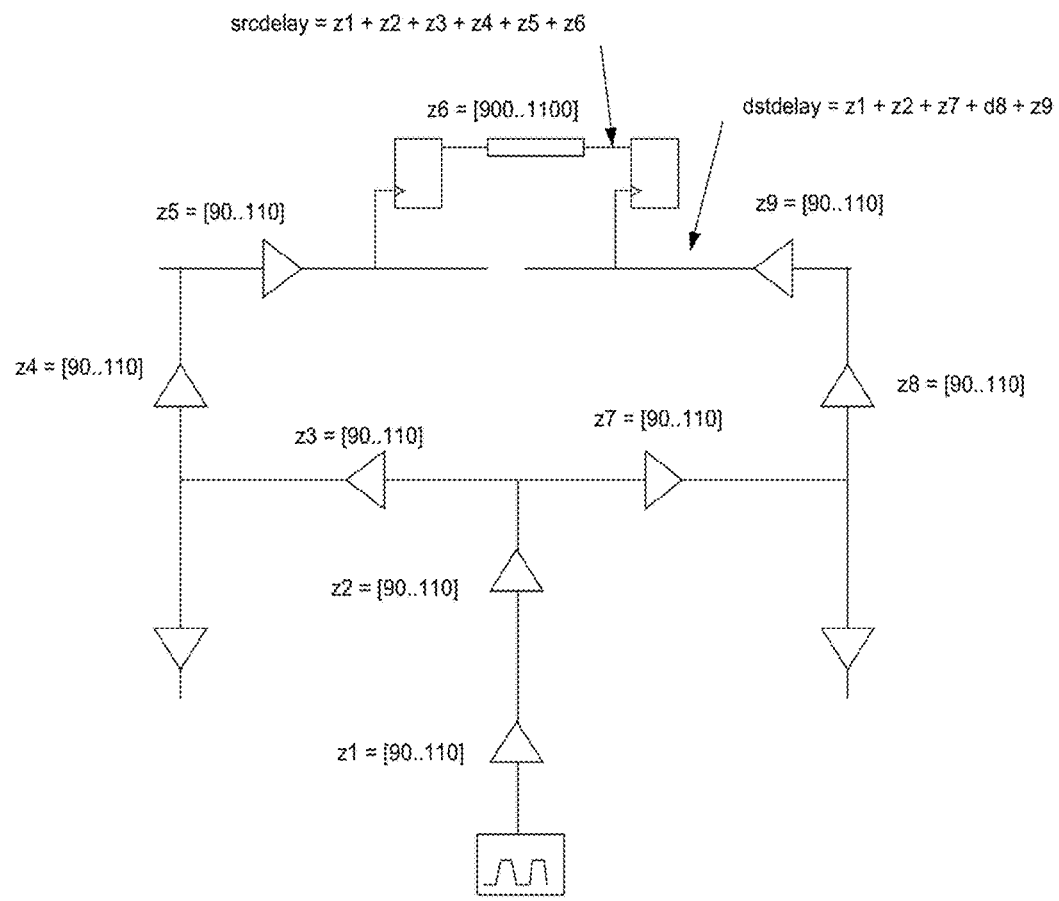
FIG. 4 is a diagram illustrating timing analysis with common clock pessimism removal according to an exemplary embodiment of the present disclosure.

FIG. 4 is a diagram illustrating timing analysis with common clock pessimism removal according to an embodiment of the present disclosure Common clock pessimism may be used to reduce clock uncertainty. The set of circuit elements that are used for each of the source and destination clock paths is tracked. When they are subtracted, the common elements may be removed. FIG. 4 shows an example of common clock pessimism removal that reduces the clock cycle from 1200 to 1160. Although the use of common clock pessimism reduces the clock cycle, further improvement is possible by using spatial correlation according to the present disclosure.

Embodiments of the present disclosure calculate a critical path delay of a circuit in the presence of correlated spatial variation. Techniques employed by embodiments of the present disclosure may apply to modeling global variation and common clock pessimism removal. The techniques employed involve an analysis of multiple global timing corners in a single timing analysis.

According to an embodiment of the present disclosure, a method for representing delay at various locations on a die as a polynomial is disclosed such that spatial variation on the die is accurately modeled. In any die, there is a range of possible delays associated with each element. Within some bounds of the range, the die will operate correctly. Each die can be thought of as having some nominal delay, and some delay variation around that nominal value. The actual delay on a die may not be known, but when modeling spatial variation, it is necessary to guaranteed that the die will function correctly as long as the delay is within some bounds. For example, when a nominal delay of a gate is 100, with unknown variation of +1-10 the circuit must operate correctly when the gate delay is between 90 and 110.

Spatial variation refers to the property that nearby circuit elements will have similar variation in their delays. For example, two gates that are located within 0.1 mm of each other may have less than 1% delay difference. According to this example, if a specific gate on some die had a delay of 93, then a nearby gate would have a delay between 92 and 94. In a case where the specific gate has an extreme value of 110, the nearby gate would have a delay between 109 and 110. Spatial variation increases with the distance. For example, at a distance of 5 mm, there would be no correlation. When the specific gate has a delay of 93, another such gate at a distance of more than 5 mm would have a delay between 90 and 110.

According to an embodiment of the present disclosure, a method for describing delay at any point on a die as a polynomial is disclosed. Points on the die that are nearby have polynomials that are similar in value. The polynomials are functions of underlying process variables, each of which has some effect on the delay across some region in the die.

In a simplified example, consider a one-dimensional surface, in contrast to a two-dimensional surface of a die. Consider a set of locations x[0], x[1], x[2] . . . across the die. These locations would normally be located at a uniform spacing. However, the uniformity in spacing is not a requirement. At each location x[i] on the die there is an associated process variation variable y[i]. The process variation variable represents some process variation that is centered on the location x[i], and spreads across some region. It is assumed that y[i] is normalized such that $-1 \Leftarrow y[i] \Leftarrow 1$, where the exact value of y is not known. It should be appreciated that [−1 . . . 1] is used as an example, but that any suitable constant may be used as a bound provided that the delays are suitably normalized.

The goal is to represent the delay variation of a circuit element at any location x on the die. The delay variation may be referred as d(x). One approach to define d(x) for the intermediate points x[i]<x<x[i+1] is to use linear interpolation. This results in the following relationship.

$$d(x)=(x-x[i])/(x[i+1]-x[i])*y[i+1]+(x[i+1]x)/(x[i+1]-x[i])*y[i]$$

d(x) is also a normalized variable representing the difference in delay compared to some nominal delay. For example if the locations are given by x[0]=0, x[1]=1, x[2]=2, then using linear interpolation the following relationships can be expressed.

$$d(0.5)=0.5*y[0]+0.5*y[1]$$

$$d(0.6)=0.4*y[0]+0.6*y[1]$$

$$d(1.7)=0.3*y[1]+0.7*y[2]$$

The actual delay of a circuit element with nominal delay c and sensitivity s may be expressed with the following relationship.

$$z[j]=c+s*d(x)$$

The delay values z[j] are each associated with a particular circuit element, not indexed by a physical location. For example circuit element number 17 might be located at x=0.5 and has nominal delay of 100 and variation of +/−10. Circuit element number 22 is located at x=0.6 and has variation of +/−10. In these cases the delay of the elements would be represented with the following relationships.

$$z[17]=100+10*d(0.5)=100+5*y[0]+5*y[1]$$

$$z[22]=110+10*d(0.6)=110+4*y[0]+6*y[1]$$

Timing analysis computes the delay of a path through a logic circuit by determining the earliest and latest possible transition times at each node in the circuit. As disclosed, the delay of every element and node in the circuit is represented as a set of polynomials. The delay at the output of any circuit element is the largest of the sum of the respective input delays and the delay through that circuit element. The slack at the destination flip-flop is the difference of the arrival time of the data less the arrival time of the clock. Since the minimum and maximum are usually required, two sets of polynomials are used to represent the min and max respectively. These sets of polynomials must include any polynomial that could potentially be the min or max under some combination of the y[i] variables. Finding the min or max potentially requires every combination of delay polynomials that arrive at a node in the circuit. Embodiments of the present disclosure include pruning the set of polynomials so that only the polynomials that might form a min or max are included, and polynomials that cannot form a min or max are not included.

For example, suppose that the two delays z[17] and z[22] listed above could be included in a maximum delay set. To find out if one of them could be removed, the value z[22]−z[17]=10+y[0]−y[1] is considered. As discussed earlier, the y[i] have been constrained to the range [−1 . . . 1] so it is possible to bound z[22]−z[17] to the range [8,12]. It is therefore certain that z[22]−z[17]>8 so z[22] is necessarily larger than z[17], and there is no reason to consider z[17] in the set of possible maximum polynomials. Timing analysis may proceed using the timing graph as described above, and appropriate polynomials as edge delays.

Figure 5:
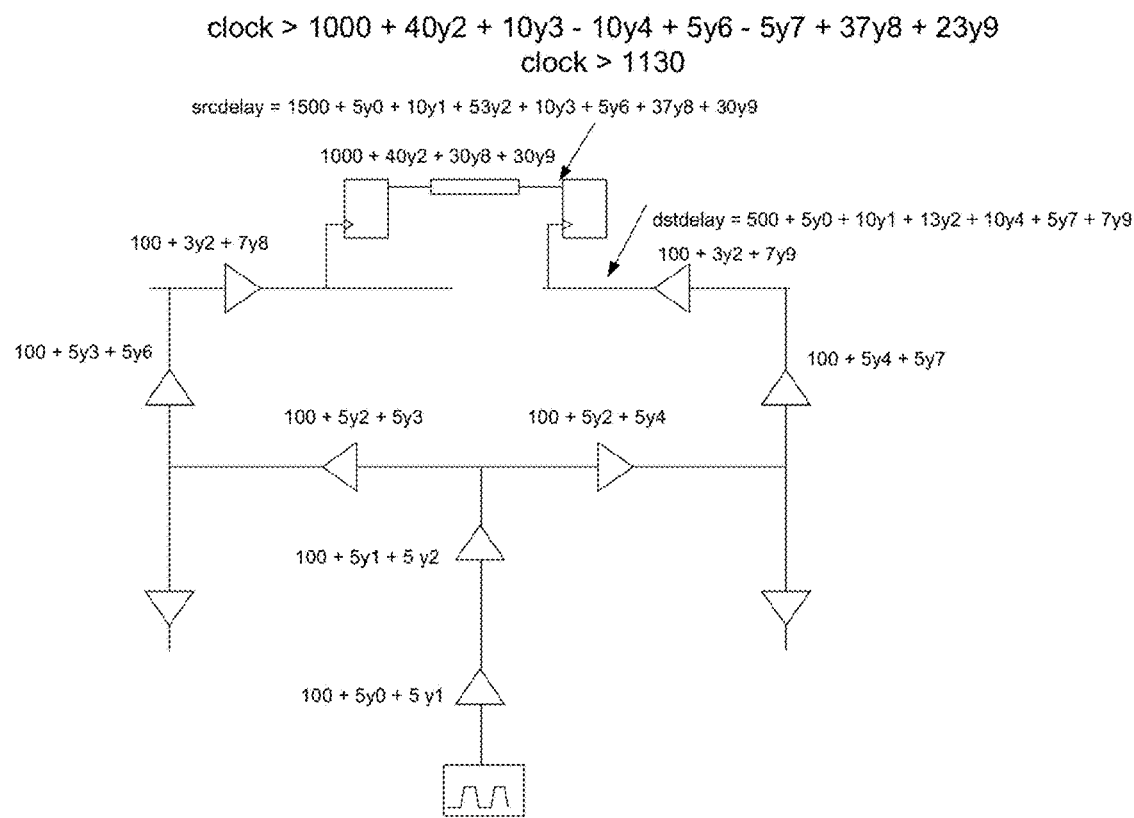
FIG. 5 is a diagram illustrating symbolic timing analysis tracking spatial correlation of circuit elements according to an exemplary embodiment of the present disclosure.

FIG. 5 is a diagram that illustrates symbolic timing analysis tracking spatial correlation of circuit elements according to an exemplary embodiment of the present disclosure. FIG. 5 illustrates how the techniques described may be applied to the example presented in FIGS. 3 and 4. Although the elements still have the same amount of variation, it can be seen that the correlations between the delays of the various clock and data path elements allow more uncertainty to be removed. The worst case delay can be found by assuming the worst case value of y[i], +/−1 as appropriate, or simply by summing the absolute values of the coefficients and the nominal delay. As a result, the clock cycle is now 1130 as oppose to 1200 and 1160 previously determined. In addition to computing the maximum of the delay, it will often be useful to compute the numerical value of the delay and/or the slack at all nodes in the circuit to help the user understand the timing at all points in the circuit.

As stated above, one objective of an embodiment of the present disclosure is to be able to model the delay of circuit elements to accurately reflect the correlation between circuit elements at some distance. Correlation of delays is generally a decreasing function of distance. However, the correlation of delays may not be related to the specific location of either of the circuit elements. Furthermore, the variation in delay of any circuit element may be the same regardless of its location on the die, and the correlation of delay between two different circuit elements is purely a function of their distance, not their location. The notion of "same" in this context may mean either a sum of the possible sources of variation, if considered as hard min/max bounds, or in RMS if they are being treated statistically. In the former case, it is desirable to guarantee that the die works for any combination of y[i] in [−1 . . . 1]. In the latter case, an assumption may be made that y[i] is statistically distributed as a set of independent random variables, and that the die works with some probability according to the distribution of the y[i].

In the example presented above, linear interpolation is used implicitly to represent the delay at various positions. Improvements may be made to this technique to achieve the goal of modeling a random process variation as a variation that is centered at some point and that has an effect on a nearby region. To model this, the concept of a kernel function is introduced. A kernel function f(x) is zero for |x|>1 and has f(0)=1. One example is a triangle kernel function.

Figure 6:
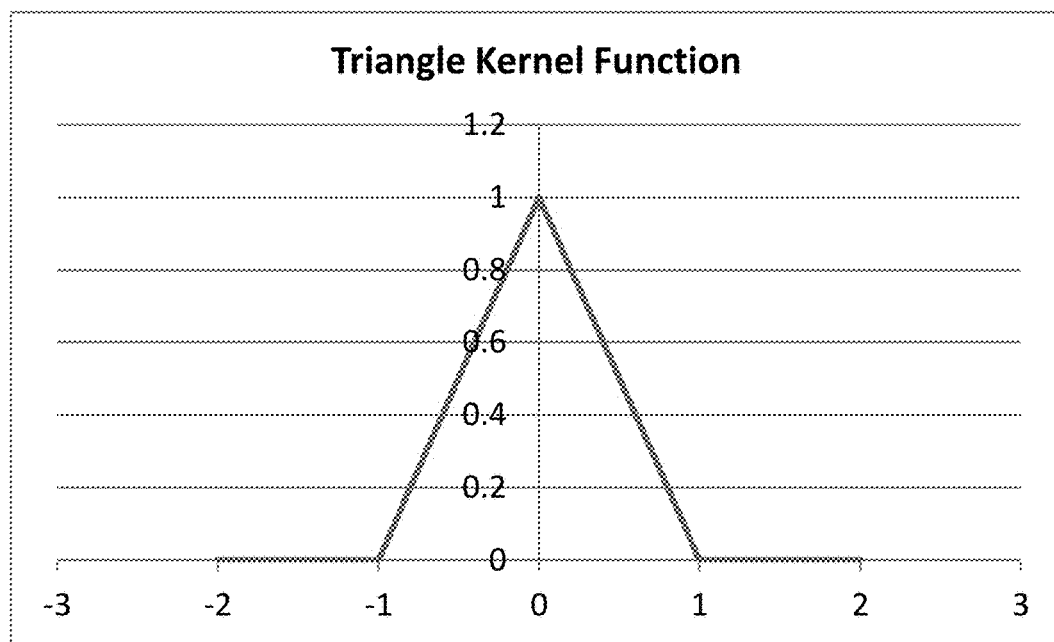
FIG. 6 is a diagram illustrating a triangle kernel function according to an exemplary embodiment of the present disclosure.

FIG. 6 is a diagram illustrating a triangle kernel function according to an exemplary embodiment of the present disclosure. In this embodiment, a die is divided into grid points x[0], x[1], . . . x[n] and the effect of the process variation is described by the value of the kernel functions at that point. It is not necessary that x[i] be the integers x[i]=i.

The x[i] may be spaced with some pitch p so that x[i]=i*p. An example of this is a pitch of 1 which is illustrated in FIG. 7.

Figure 7:
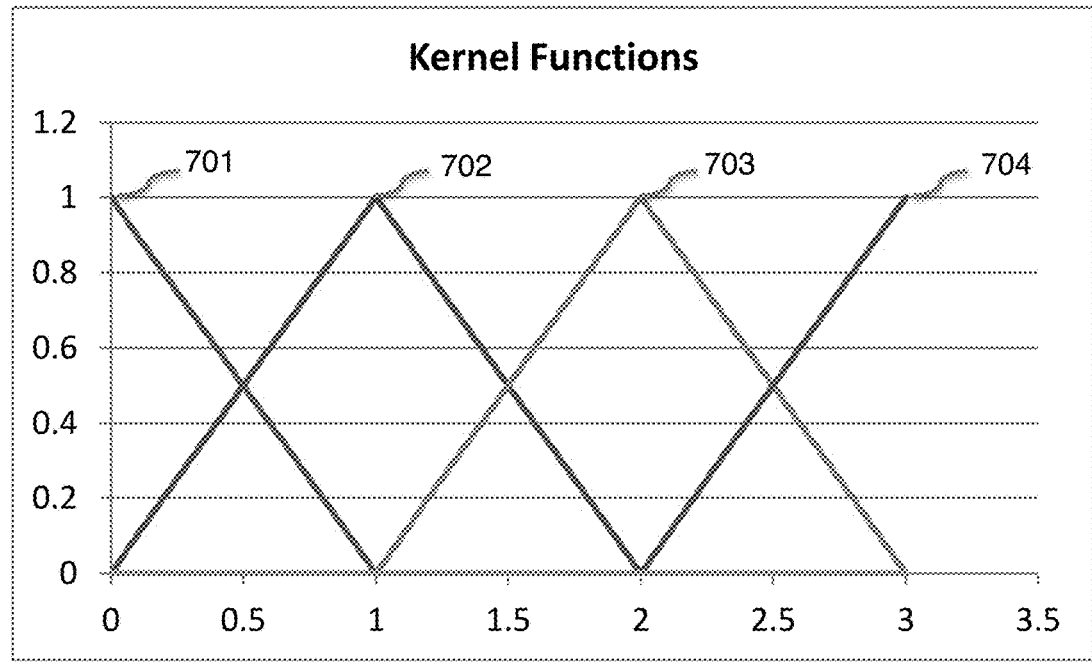
FIG. 7 is a diagram illustrating multiple triangle kernel functions used in linear interpolation according to an exemplary embodiment of the present disclosure.

FIG. 7 is a diagram illustrating multiple triangle kernel functions used in linear interpolation according to an exemplary embodiment of the present disclosure. A first kernel function is represented with 701. A second kernel function is represented at 702. A third kernel function is represented at 703. A fourth kernel function is represented at 704. The kernel functions define the value of the polynomial coefficients a[i] according to a[i]=f(x−x[i]). For example, as shown in FIGS. 7, at x=0.6, a[0]=0.4 and a[1]=0.6. The triangle kernel function with a pitch of 1 defines linear interpolation. The coefficients must be scaled by the magnitude of the actual variation to produce a polynomial that models this. For example if the delay has a nominal value of 100 and variation of 10, the coefficients described would be scaled by 10 to produce 100+4*y[0]+6*y[1].

Figure 8:
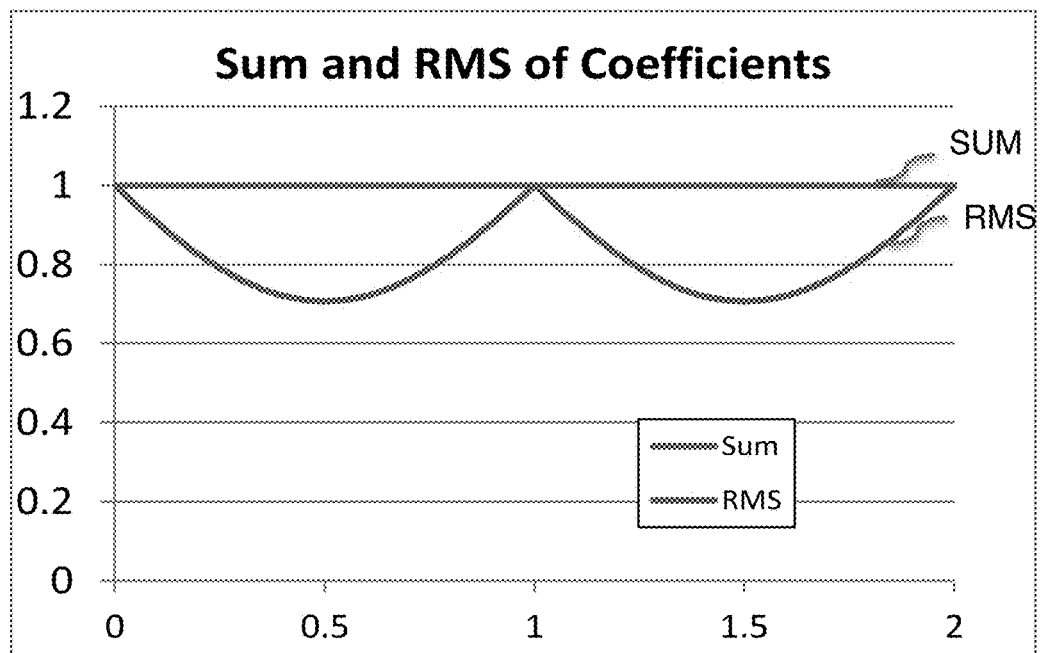
FIG. 8 is a diagram that illustrates linear and root means square magnitude of linear interpolation according to an exemplary embodiment of the present disclosure.

As stated above, the conditions responsible for random spatial variation will produce constant magnitude of variation in either linear or RMS norm, and correlation vs. distance relationship that is independent of the location of the pair of points. The former is expressed as the sum of the a[i], or RMS of the a[i] for linear and RMS magnitudes respectively. FIG. 8 is a diagram that illustrates linear and RMS magnitude of linear interpolation according to an exemplary embodiment of the present disclosure. It can be seen that linear interpolation produces a uniform linear sum, but that variable RMS makes it unsuitable for a statistical model.

The correlation of two sets of data u and v is given by the following relationship.

$$\rho = \frac{\sum (u_i - \bar{u}) \times (v_i - \bar{v})}{\sqrt{\sum (u_i - \bar{u})^2 \times (v_i - \bar{v})^2}}$$

In this example, the correlation between the polynomial interpolation functions with u(x) representing the set of random values of the polynomial interpolation at one point and v(x+d) representing the interpolation at some distance d away is of interest. Since the polynomials are in terms of the y[i] which are 0 mean independent random variables, the correlation as a function of distance and starting location may be represented with the following relationship.

$$\rho_{x,x+d} = \frac{\sum_i f(x - x_i) \times f(x + d - x_i)}{\sum_i \sum_j (f(x - x_i) \times f(x + d - x_j))^2}$$

It is desirable for $\rho_{x,x+d}$ to be a decreasing function of d, but also independent of x. To explore the properties of the triangle kernel function with pitch=1, $\rho_{x,x+d}$ can be plotted as a function of d for various values of x.

Figure 9:
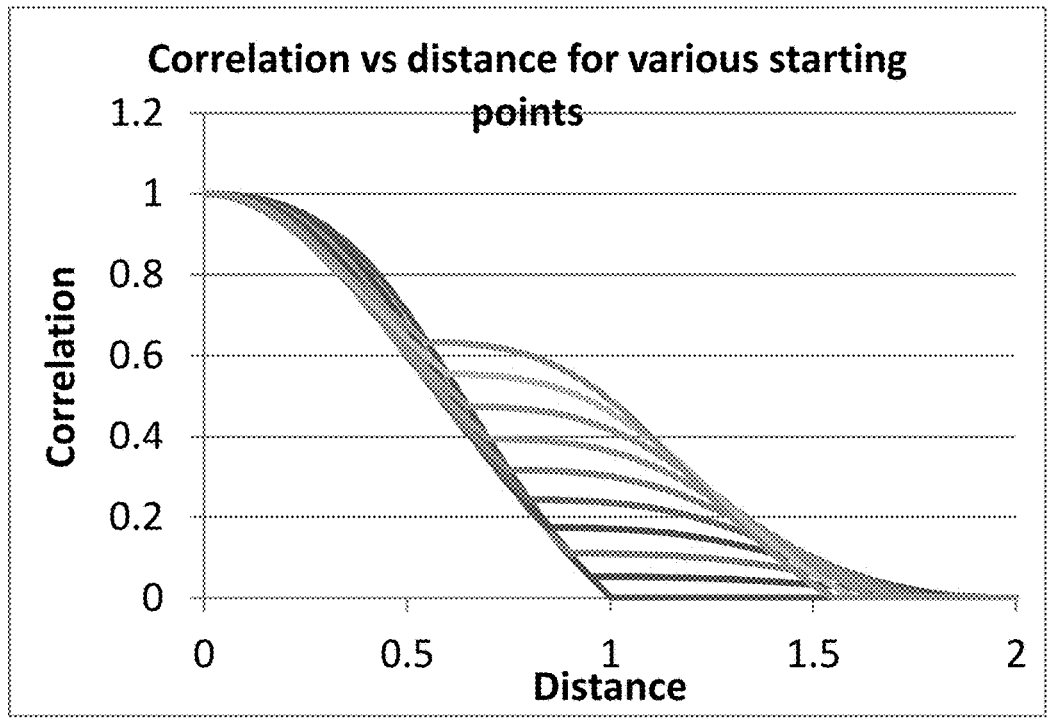
FIG. 9 is a diagram that illustrates correlation vs. distance for various starting points using linear interpolation according to an exemplary embodiment of the present disclosure.

FIG. 9 is a diagram that illustrates correlation vs. distance for various starting points using linear interpolation according to an exemplary embodiment of the present disclosure. As shown in FIG. 9, the relationship of correlation vs. distance is highly dependent on the starting point, making it unsuitable for a good quality spatial variation model. In order to improve on this, it is possible to use a smaller pitch p and introduce more sources of variation into each point. Given the constraint that the kernel function spans a distance of 2 in the range [−1,1], and the definition a[i]=f(x−x[i]), there are 2/p non-zero coefficients in the polynomial. It is desirable to reduce the number of coefficients as much as possible to minimize the time to calculate the variation.

Figure 10A:
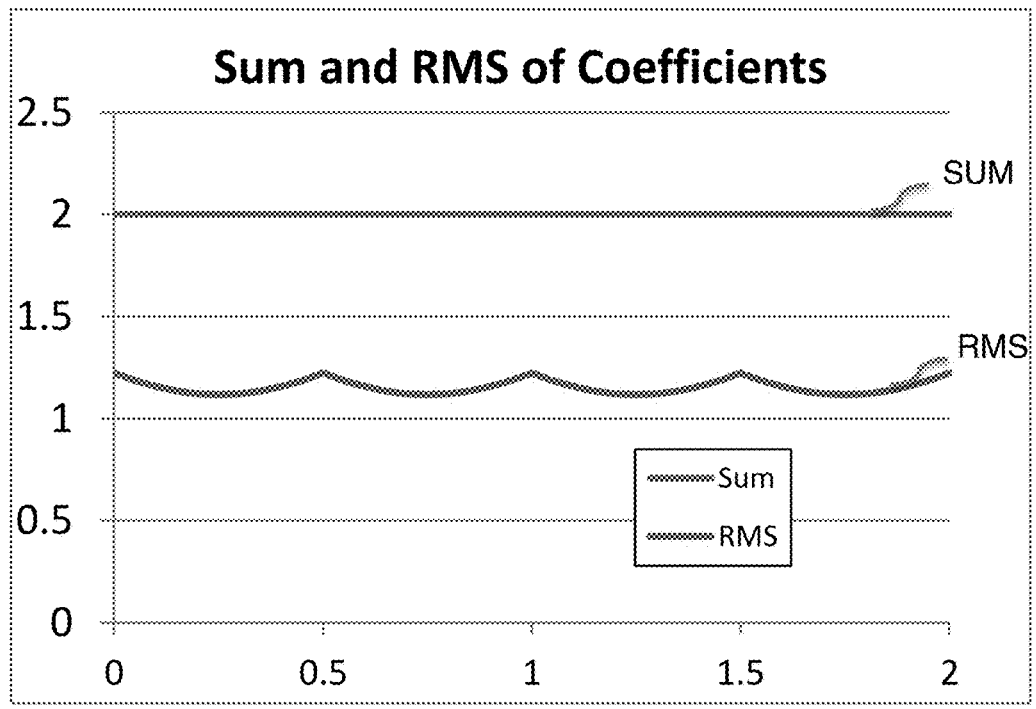
FIG. 10A is a diagram that illustrates linear and RMS magnitudes of linear interpolation for a triangle kernel function with a pitch of 0.5 according to an exemplary embodiment of the present disclosure.
Figure 10B:
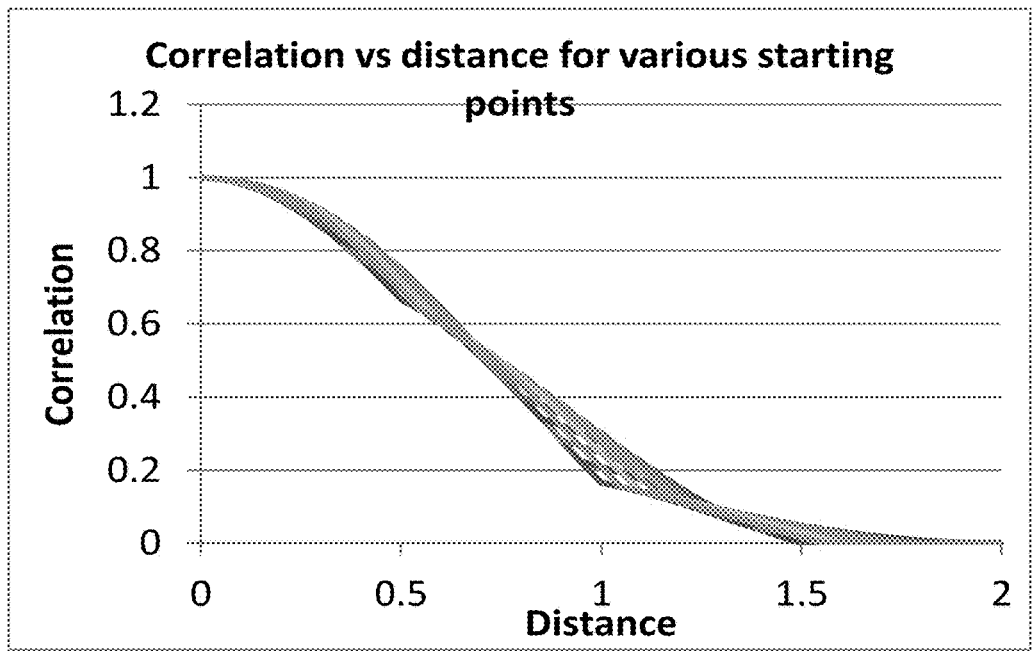
FIG. 10B is a diagram that illustrates correlation vs. distance for various starting points for a triangle kernel function with a pitch of 0.5 using linear interpolation according to an exemplary embodiment of the present disclosure.

FIG. 10A is a diagram that illustrates linear and RMS magnitudes of linear interpolation for a triangle kernel function with a pitch of 0.5. FIG. 10B is a diagram that illustrates correlation vs. distance for various starting points for a triangle kernel function with a pitch of 0.5 using linear interpolation, which can be seen to have much less variation in correlation vs distance depending on the starting point. In this example, it can be determined that a pitch of 0.5 is suitable for triangle kernel functions, as shown in FIGS. 10A and 10B. This requires the use of 4 non-zero coefficients in the polynomials.

Figure 11:
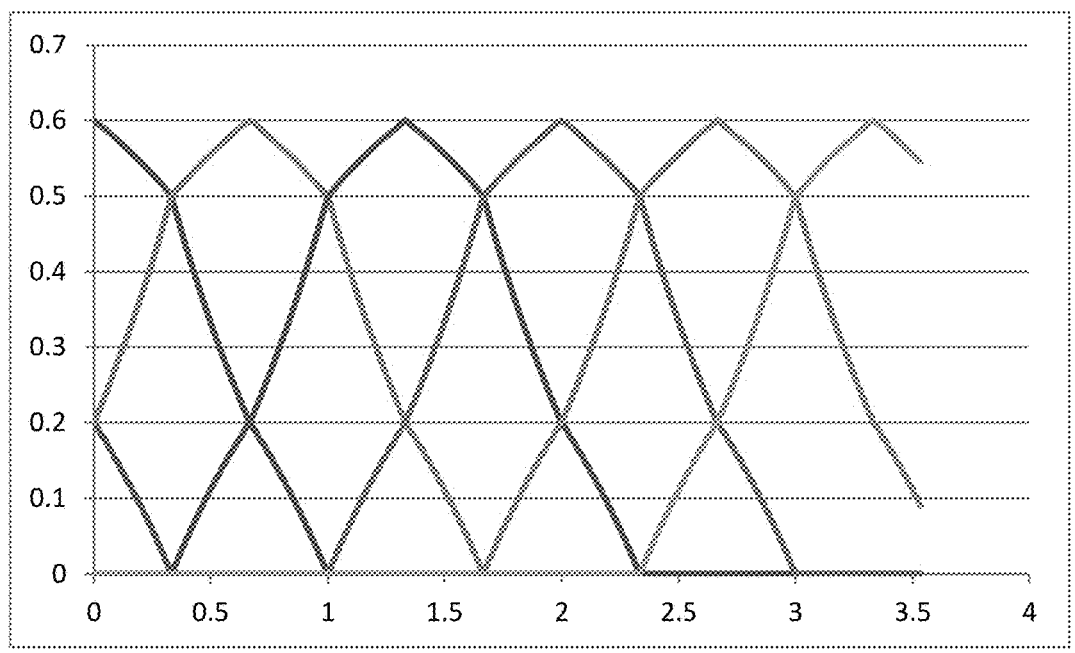
FIG. 11 illustrates a plurality of kernel functions derived by normalizing a triangle function according to an exemplary embodiment of the present disclosure.

It should be appreciated that other kernel functions may also be considered for providing desirable properties with fewer non-zero coefficients. FIG. 11 illustrates a kernel function derived by normalizing a triangle function according to an exemplary embodiment of the present disclosure. For example, the kernel function illustrated in FIG. 11 is derived by dividing a triangle kernel function with a pitch of p=⅔ by the sum of the coefficients at each location. This function has uniform sum and good correlation properties.

Figure 12A:
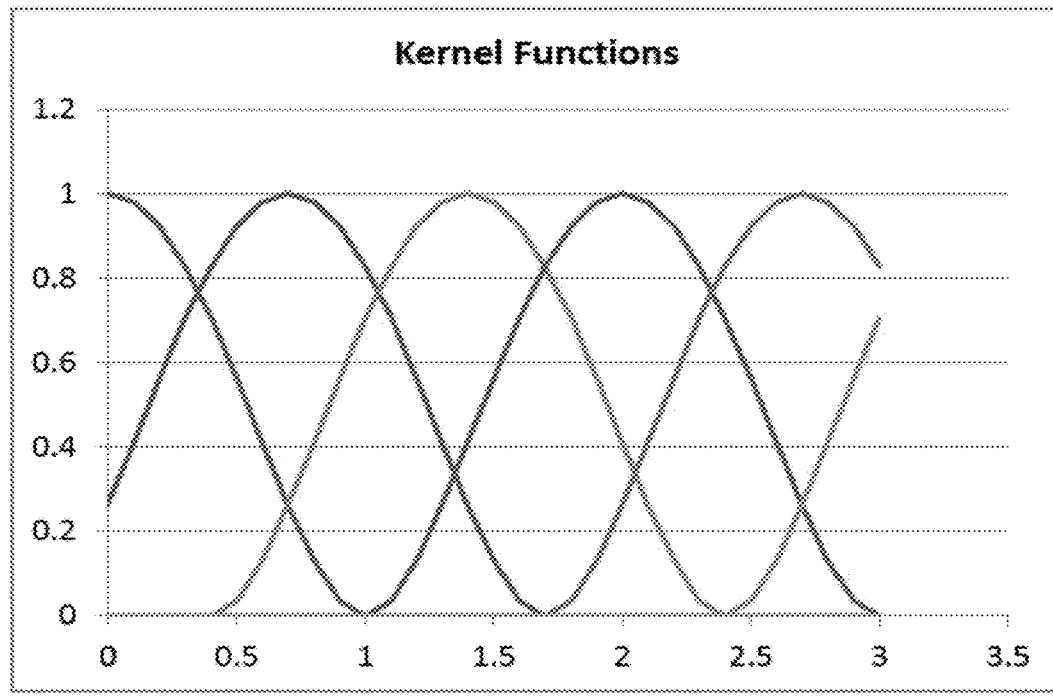
FIG. 12A is a diagram that illustrates a plurality of quartic kernel functions according to an exemplary embodiment of the present disclosure.
Figure 12B:
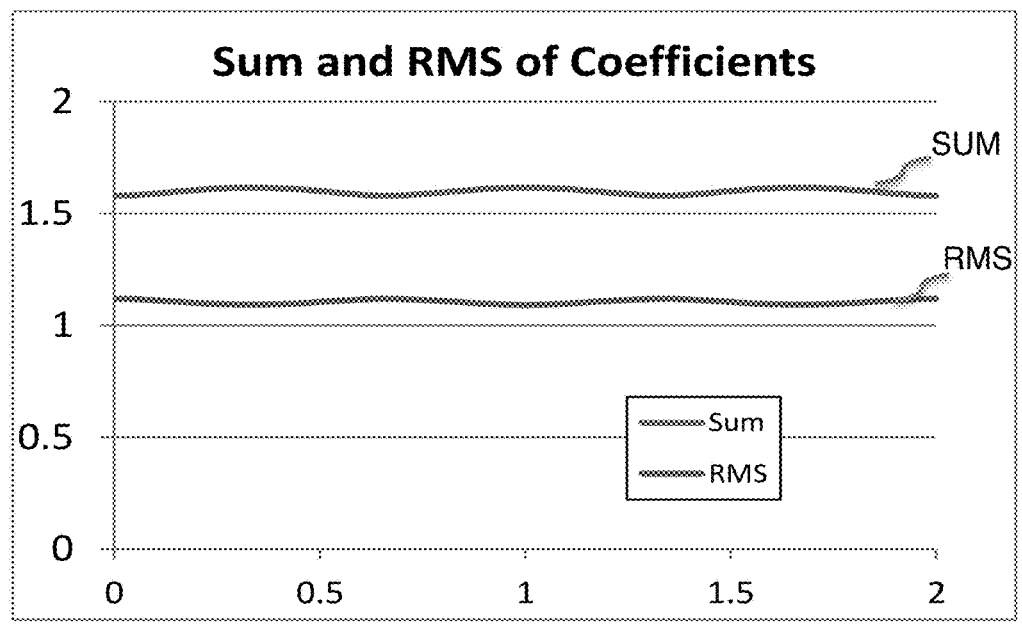
FIG. 12B is a diagram that illustrates linear and RMS magnitudes of linear interpolation for a quartic kernel with a pitch of ⅔ according to an exemplary embodiment of the present disclosure.
Figure 12C:
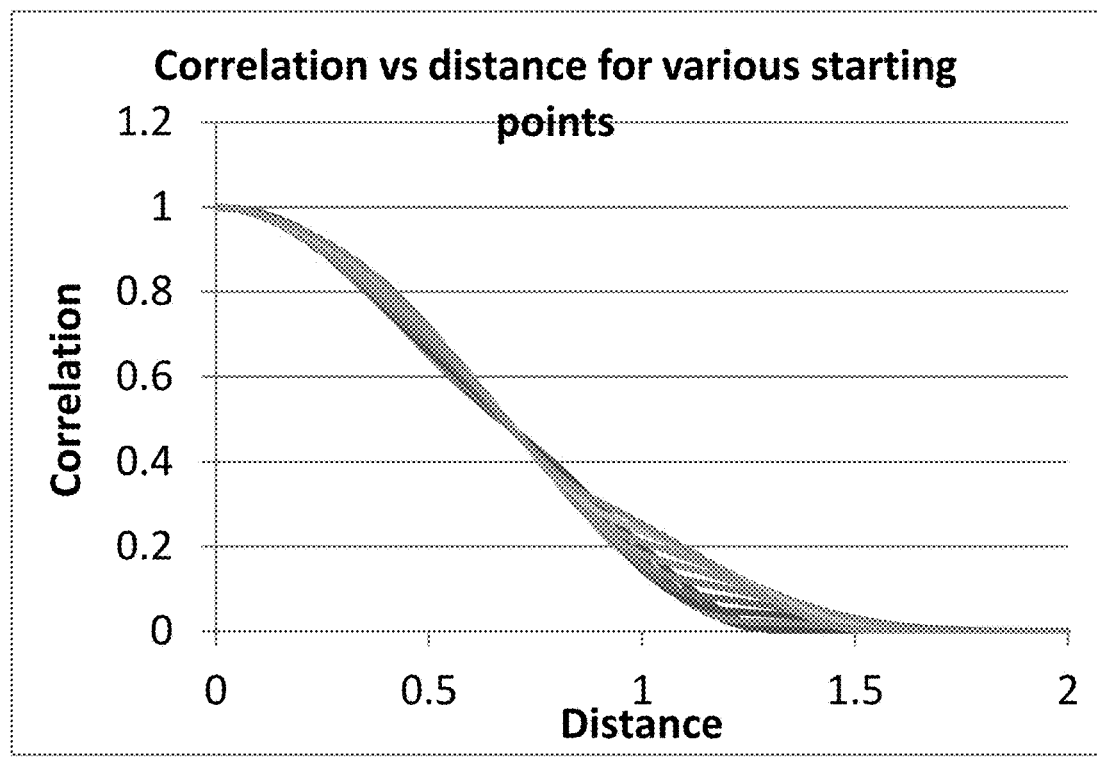
FIG. 12C is a diagram that illustrates correlation vs. distance for various starting points for quartic kernel functions with a pitch of ⅔ using linear interpolation according to an exemplary embodiment of the present disclosure.

It should be appreciated that other functions may be derived from higher order polynomials, such as piecewise cubic interpolation, or a quartic function. In particular, the quartic kernel function $f(x)=1-2\times x^2+x^4, |x|<1$ satisfies the constraints on the kernel function and has satisfactory norms and correlation for a pitch of ⅔, as shown in FIG. 12A. FIG. 12B is a diagram that illustrates linear and RMS magnitudes of linear interpolation for a quartic kernel with a pitch of ⅔ according to an exemplary embodiment of the present disclosure. FIG. 12C is a diagram that illustrates correlation vs. distance for various starting points for the quartic kernel function with a pitch of ⅔ using linear interpolation according to an exemplary embodiment of the present disclosure. Different kernel functions having either a smaller or larger pitch may be selected depending on the desired trade-off between accuracy and computational effort. The quartic kernel function with a pitch of ⅔ may be preferred since it requires only 2/(⅔)=3 non-zero coefficients in the polynomial.

The correlation distance of the kernel function must be normalized to the actual correlation distance of the process variation on the die. For example, the quartic function has a correlation distance of approximately 1.3, deemed to be the distance where correlation is approximately equal to 0.1. Assuming that process variation correlates to 0.1 at a physical distance of 5 mm on the die, the distance of 5 mm must correspond to 1.3 units on the grid. In this example, a grid spacing is chosen to be 5/1.3=3.86. If the kernel functions are space with a pitch of ⅔ then they correspond to a physical spacing of ⅔*3.85=2.56 mm.

The correlation vs. distance function h(x) for a given kernel function $f(x)$ may be expressed by the convolution $h(x)=f(x)\otimes f(x)$ where $\otimes$ represents the convolution operator. To select an appropriate kernel function for a given h(x) that is measured on a particular process, one may either scale one of the kernel functions given above to provide an appropriate bound on the observed correlation, or find a suitable approximation of h(x) that can be used to derive an analytical or numerical solution for $f(x)$. For example, if the correlation is observed to have a triangle function behavior, then $f(x)$ may be chosen as a rectangle function. Following the selection of the kernel function the pitch may be chosen to give a suitable smooth correlation vs. distance function as a function of location.

In order to extend the one-dimensional representations presented to the two-dimensional space of integrated circuits, the following extensions are proposed. The locations x[i] is first extended to a two dimensional space $X=(x_0, x_1)$ with $X[i,j]=(i\times p, j\times p)$ representing the locations of a grid of process variation variables y[i,j]. The polynomial coefficients a[i,j] may now be defined either using a Cartesian product $a[i,j]=f(x_0-i\times p)\times f(x_1-j\times p)$ or in a polar form $a[i,j]=f(\sqrt{(x_0-i\times p)^2+(x_1-j\times p)^2})$. The former is anisotropic since it is not a function of distance from each y[i,j], while the latter is isotropic. The constraints of using a two dimensional grid of process variables poses a challenge for generating an exact model for the variation. An arbitrarily accurate approximate may be made by decreasing the pitch. In the present example, a pitch of ⅔ and the quartic kernel results in a small error which is tolerable.

It should be appreciated that the approaches presented for defining a spatial variation across a die in terms of a polynomial that represents the correlation between elements at some distance may be extended to include multiple sources of variation. For example, one source of variation might be random with a magnitude of 5% and correlation distance of 5 mm, while another might have a magnitude of 3% and correlation distance of 10 mm. Embodiments of the present disclosure may use the sum of two sets of process variables to represent these effects. Similarly, global variation that is constant across the die may be represented using a distinct variable y[i] with a[i] being a constant at all locations on the die. If there are long range effects that span larger than the die, embodiments of the present disclosure may represent these with a triangle kernel and pitch p that is the width of the die, so the effect increases linearly across the die. In the case of variation that is completely uncorrelated between circuit elements, a unique y[i] may be defined for each circuit element, and a[i]=1 for the corresponding circuit element, a[i]=0 for all other elements. As such, embodiments of the present disclosure accounts for the possibility of multiple global corners, across die variation, correlated spatial variation, as well as random uncorrelated variation, all within a single framework. Further, by incorporating multiple sources of variation in the polynomials, including global sources of variation, embodiments of the present disclosure may perform multi-corner analysis in a single timing analysis.

Given these techniques for representing the variation on a die as a polynomial that is the sum of various process influences, a timing analysis may be performed using polynomials to represent the set of process variations on each circuit element in the die. There are a number of methodologies available that may be utilized. A first methodology uses min/max modeling, and has been implicitly described above. A second methodology uses statistical modeling with specific distributions to find a statistical distribution of delays.

In min/max modeling, each source of process variation has some range, and it is desired that the die work with any combination of process variation without regard to any specific probability distribution. Therefore, the polynomials are generated such that the bounds used for y[i] correspond to the process limits. For example, if the bounds adopted for y[i] are [−1 . . . 1], and a circuit element has a nominal delay of 100 and min/max variation of +/−10%, then the coefficients a[i] would be required to sum to 10. In the case of the quartic polynomial, the integral of the area is 16/15, so when overlapped with a pitch of ⅔, the magnitude would on average be 3/2 of the magnitude, or 16/15*3/2=8/5, as seen in FIG. 12B. In the case of the two dimensional anisotropic formulation with pitch of ⅔ the product of the two dimensional functions would be $$\left(\frac{8}{5}\right)^2 = \frac{64}{25}.$$

To normalize the polynomial to have a variation of 1, the function value would therefore be multiplied by the inverse, which is $$\frac{25}{64}.$$

Considering a circuit element located at x0=1.3, and x1=2.4, or equivalently located at the point (1.3, 2.4) the non-zero coefficients of the polynomial are due to kernel functions centered within +/−1 of this location in each dimension. Since x0=1.3, then any kernel function centered between 1.3−1=0.3, and 1.3+1=2.3 would have a non-zero value. The table below the label x0=1.3 shown in FIG. 19A gives the values of i, x0[i], x0−x0[i], and f(x0−x0[i]). The particular values of i that are in this range are i=1, 2, 3 with the values x0[i]=0.667, 1.333, 2.0. The values of x0−x0[i] are given by 1.3−0.667=0.633, etc. as shown in the column labeled x0−x0[i]. The value of the kernel function at each of these points is shown in the column f(x0−x0[i]), with the value for i=1 being given as f(0.633)=0.359. Similarly, the values of j, x1[j], x1−x1[j], and f(x1−x1[j]) are given for to the right of the label x1=2.4. In this table, j=3, 4, 5, and the coefficients f(x1−x1[j]) are given as 0.706 etc. Therefore, the column f(x0−x0[i]) and the row f(x1−x1[i]) give the values of the kernel function at each possible value of x0 and x1. For example, the row i=1 gives f( )=0.359 and the column j=3 has f( )=0.706, so the value 0.359*0.706*25/64 produces the entry a[1,3]=0.099. The normalized coefficients may then be derived as f(x0−x0[i])*f(x1−x1[j])*25/64, as shown. Note that these sum to 1.001, close to the desired 1.0. Finally, the polynomial coefficients are the normalized coefficients times the desired variation of 10 (corresponding to the min/max variation of 10 mentioned above.)

As shown, the polynomial is to two digits accuracy, 100+0.99*y[1,3]+1.21*y[1,4]+0.02*y[1,5]+2.75*y[2,3]+3.36*y[2,4]+0.06*y[2,5]+0.72*y[3,3]+0.88*y[3,4]+0.02*y[3,5]. This polynomial will be associated with the delay of the circuit element. It can be seen that the sum of the coefficients is 10.01, very close to the desired value of 10, reflecting total variation of +/−10.

Figure 13:
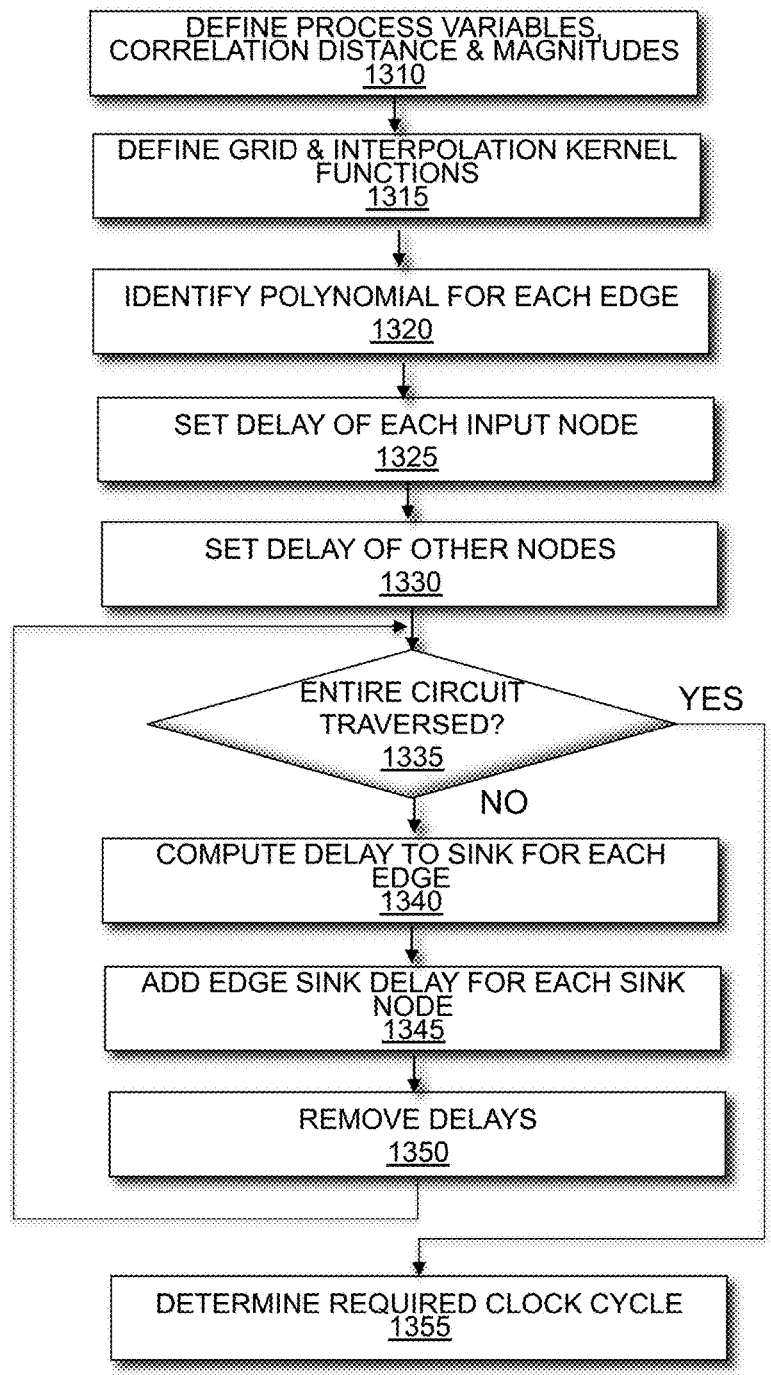
FIG. 13 is a flow chart illustrating a method for performing timing analysis using min/max bounds according to an exemplary embodiment of the present disclosure.

Timing analysis may proceed by using methods similar to existing timing analysis, but by replacing the use of specific delay values or ranges with polynomials. FIG. 13 is a flow chart illustrating a method for performing timing analysis on a system using min/max bounds according to an exemplary embodiment of the present disclosure. The procedures illustrated in FIG. 13 highlight the methodologies described above, and may be used in part to implement procedure 150 shown in FIG. 1. At 1310, process variables, correlation distance, and magnitudes corresponding to variation on a die are defined. The variation on the die may be predicted or observed. It should be appreciated that variables representing other criteria other than process may also be defined and applied to the procedures following 1310.

At 1315, one or more grids and interpolation kernel functions that correspond to a pitch and desired correlation distance are defined.

At 1320, for each edge, a polynomial is constructed that models its delay. According to an embodiment of the present disclosure, the polynomial is constructed by its location and associated process variables.

At 1325, delay of each input node to a circuit is set to a minimum of 0 and maximum of 0. According to an embodiment of the present disclosure, these are polynomials with no variables.

At 1330, delay of all other nodes is set to having minimum and maximum delays that are an empty set of polynomials.

At 1335, it is determined whether the entire circuit has been traversed. If the entire circuit has not been traversed, control traverses an untraversed path in the circuit. According to an embodiment of the present disclosure, control proceeds to 1340 where each path in the circuit is traversed from inputs to outputs in a topologically sorted order. If all circuits in the system have been traversed, control proceeds to 1355.

At 1340, for each edge, a delay to a sink is computed as a sum of a delay to its source and a delay of that edge.

At 1345, for a sink node, an edge sink delay is added to a set of delays for minimum and maximum delays.

At 1350, delays are removed. According to an embodiment of the present disclosure, delays that cannot be minimum or maximum are removed from a minimum delay polynomial set and a maximum delay polynomial set.

At 1355, the required clock cycle is determined. According to an embodiment of the present disclosure, for destination flip-flop nodes, a required clock cycle is determined from a numerical difference between a set of maximum polynomials in a source clock plus data set, less a set of minimum polynomials in a destination clock set. This may be achieved by assuming a worst case value of process variables.

According to an embodiment of the present disclosure, the procedure described in FIG. 13 generates a representation of a delay to each output node expressed as a polynomial. The maximum is the critical path delay. In the case of flip-flops, the clock cycle is expressed as a polynomial. The maximum possible value of each polynomial is computed as the sum of the absolute value of the coefficients A set of delays representing the clock networks may also be generated from the procedure described in FIG. 13. For example, the clock network delay to each flip-flop may be computed. The source delay to each source flip-flop node will be the clock delay to that node. The total circuit delay to a destination flip-flop is the delay of the source flip-flops and logic, less the clock delay to the destination. It should be appreciated that the maximum of a difference is the set of differences between the maximum set on the addend and the minimum set of the subtrahend. The maximum value of this set will define the minimum clock cycle for each flip-flop to flip-flop path.

According to an embodiment of the present disclosure, the procedure described in FIG. 13 may be modified to perform statistical timing analysis using symbolic delays. For example, suppose that a circuit element has a nominal delay of 100 and a standard deviation of 2. A goal may be established to perform timing analysis on polynomials while ensuring that all polynomials that could potentially be the maximum are retained during the timing analysis. This may be achieved by either precise pruning of the polynomial set, or simple linear pruning of the polynomial set.

With the precise pruning approach, each polynomial represents the expected distribution of the delays. For example, two polynomials may represent delays with nominal of 100 and 110 respectively, and standard deviations of approximately 1 as shown in the relationships below.

$$z[17]=100+0.7*y[0]+0.7*y[1]$$

$$z[22]=110+0.6*y[2]+0.6*y[3]+0.5*y[4]$$

In general the coefficients will be the kernel function value scaled by the standard deviation of delay of the circuit element. To determine if $z[22]$ strictly dominates $z[17]$ to an acceptable probability, $z[17]$ may be subtracted.

$$z[22]-z[17]=10-0.7*y[0]-0.7*y[1]+0.6*y[2]+0.6*y[3]+0.5*y[4]$$

The result has a mean of 10 and standard deviation of 1.4. As such, a 7.16 sigma probability exists that this has a value >0. Since a random variable may take on any unbounded value, some specific threshold of probability is selected to deem too unlikely to include a delay path in the set of delays. For example, a design might be determined to have less than 1,000,000 possible paths, and a 0.001 probability that any one of these paths is incorrectly discarded is desired. Therefore, a 0.001/1,000,000=1e-9 is selected as a probability of being critical as a threshold to discard a path from a maximum computation. This corresponds to about 6 sigma probability, representing 1e-9. Since the probability that $z[17]>z[22]$ is a 7.16 sigma event, $z[17]$ may be discarded as having insignificant probability. Equivalently, we may represent the 6 sigma variation of a delay by scaling each of the coefficients by a factor of 6, and determine if the RMS of the difference in delays exceeds the difference in the constants. For the above example we would express the 6 sigma value of $z[17]$ with the following relationship.

$$z[17]=100+4.2*y[0]+4.2*y[1]$$

The difference of $z[22]-z[17]$ would still have a mean of 10, but 6 standard deviations of 8.4, which is less than 10. As such, $z[17]$ would be discarded.

The precise pruning approach requires squaring and square roots and may be time consuming. It is also possible to use a simple method that is faster to compute, and pessimistic compared to precise pruning. In order to achieve this, the coefficients of the polynomials are chosen so that they correspond to a range that includes more variation than can occur with a reasonable probability. For example, 6 sigma may be selected, which can only occur 1 in $10^9$ occasions, as being a sufficient probability to retain. Therefore a 6 sigma event with the example standard deviation of 2 corresponds to a variation of 12. The polynomial $100+12*d(x)$ may be constructed to represent the 6 sigma variation of this element. Since the linear sum of absolute values always exceeds the RMS sum of them, it is always pessimistic to use pruning (as in the min/max method) comparing the sum of the differences of coefficients (linear pruning) rather than the RMS difference (exact pruning). However, the improved accuracy of exact pruning will generally be worth the extra time to perform the computation.

The interpolation polynomials $d(x)$ now need to have a RMS of 1. Since the integral of the square of the quartic function from $-1 \ldots 1$ is 256/315, and its RMS is the square root of this, to normalize the quartic function with a pitch of ⅔, the coefficients would be scaled according to $$\left(\frac{256}{315} \times \frac{2}{3}\right).$$

Note the difference of the linear order compared to the quadratic order from the previous formulation with RMS being the square root of the integral of squares. Using the 6 sigma scaling for the circuit element, the polynomial can be constructed using the interpolation shown in the table illustrated in FIG. 19B. The process is similar to that described earlier, however using a different scaling corresponding to the RMS magnitude of the kernel function being 315/256 instead of 8/5 and the variation being 12 (6 sigma*2 standard deviation) instead of 10. With precise or exact pruning, the scaling would only include the standard deviation of the delay of the circuit element.

As such, the polynomial expression for the circuit element would be $100+2.49*y[1,3]+3.05*y[1,4]+0.06*y[1,5]+6.93*y[2,3]+8.48*y[2,4]+0.16*y[2,5]+1.81*y[3,3]+2.21*y[3,4]+0.04*y[3,5]$.

The polynomials propagated through the timing analysis would now correspond to 6 sigma variation of the die. This goal of identifying the actual variation may be achieved by dividing the coefficients of each of the polynomials by 6 to obtain the variation of each potentially critical path in terms of a 1 sigma variation. For the above element, the one sigma polynomial would be $100+0.41*y[1,3]+0.51*y[1,4]+0.01*y[1,5]+1.15*y[2,3]+1.61*y[2,4]+0.03*y[2,5]+0.30*y[3,3]+0.37*y[3,4]+0.01*y[3,5]$.

According to an embodiment of the present disclosure, the polynomials also include the worst case combination of variations in their terms. For example, using a simpler polynomial for the remainder of this explanation, if the polynomial $100+1*y[0]+2*y[1]+2*y[2]$ appears in a critical path term, the worst case delay sensitivity is 3 per sigma, being the RMS sum of 1, 2, and 2.

Figure 14:
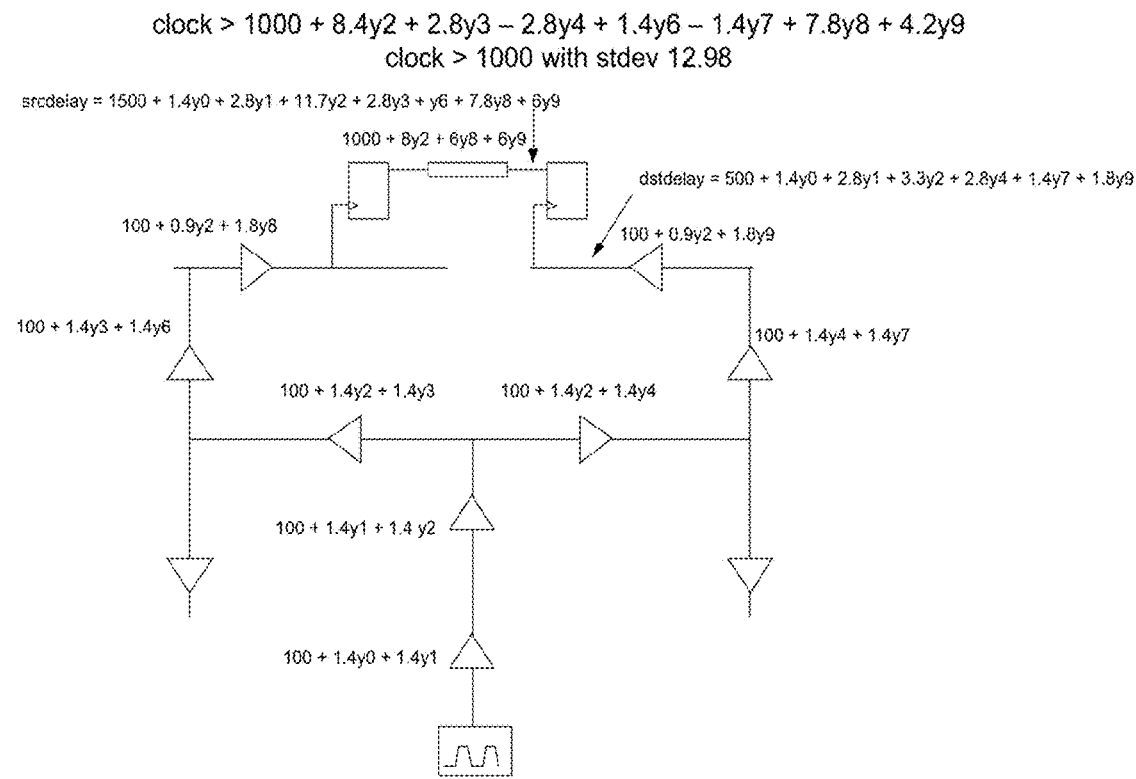
FIG. 14 is a diagram that illustrates statistical timing analysis using correlated spatial variation according to an exemplary embodiment of the present disclosure.

FIG. 14 is a diagram that illustrates statistical timing analysis using correlated spatial variation according to an exemplary embodiment of the present disclosure. In contrast to the examples illustrated in FIGS. 3-5 where min/max delay spreads were assumed to be 10%, the standard deviation is smaller and is assumed to be 2% for each clock element illustrated in FIG. 14. The data path may have a smaller standard deviation as it is the sum of a number of uncorrelated elements. The resulting clock cycle now has a mean that is exactly the data path delay of 1000 with a standard deviation of 12.98. Taking a suitable number of standard deviations will produce the required clock cycle for a specified probability of operation. For example, if this is the only path and a failure rate of 0.001, being 3.09 sigmas, is desired, then the clock cycle would be chosen to be 1000+3.09*12.98=1040.

However, in general there are many paths and each represents a possible failure. As a first step, the total failure rate must be divided among all possible paths. For example, if there are 4 paths and a total desired failure rate of 0.001, then 0.001/4=0.0025 failure, or 3.48 standard deviations would be allocated to each path. The maximum of the calculated path delays would then be used as the critical path delay.

Consider the example below with 4 paths and various polynomials and RMS sensitivities as shown in FIG. 20A.

As a first step, the time required for 3.48 standard deviations would be calculated for each and the maximum taken to form an initial guess as shown in FIG. 20B.

As such, a critical path delay of 110.44 is sufficient to guarantee a total of less than 0.001 failures. To improve on this bound the actual failure rate is calculated at this timing and iteratively searched for a better bound. By using an iterative strategy such as binary search or Newton-Raphson a tighter bound can be found. First, the actual failure rate per path is calculated using the current guess of 110.44. For each path, the specified delay corresponds to a specific number of standard deviations from the mean, and the failure rate can therefore be calculated per path. For example, a delay of 110.44 corresponds to 4.221 standard deviations of a path with nominal delay of 102 and standard deviation of 2: (110.44−102)/2=4.221 as shown in FIG. 20C. The computed failure rates have a sum of 4.16e−4 which is less than the 0.001 that can be tolerated.

By iterating on this using one of the methods above, this can be improved to 109.94. Each iteration calculates the failure rate using the method above as illustrated in FIG. 20D. When using a binary search, a lower bound is the maximum of the constants in the polynomials which in this example is 102 from path 2. The clock cycle may be iterated by taking an intermediate value, in this case (110.44+102)/2=106.22 and evaluating the failure rate at this point. The intermediate value is used as either a lower or upper bound depending on whether the failure rate is higher or lower respectively than the target failure rate. When using the Newton-Raphson approach, the next iterate is taken using the Newton-Raphson formula and calculating the derivative of the failure rate. A Newton Raphson iteration may use the logarithm of the failures because the failure rate is exponentially sensitive to the delay, so using the logarithm may produce faster convergence.

As shown in the table above, each path has a different failure rate, but the total probability of failure does not exceed the 0.001 target.

Figure 15:
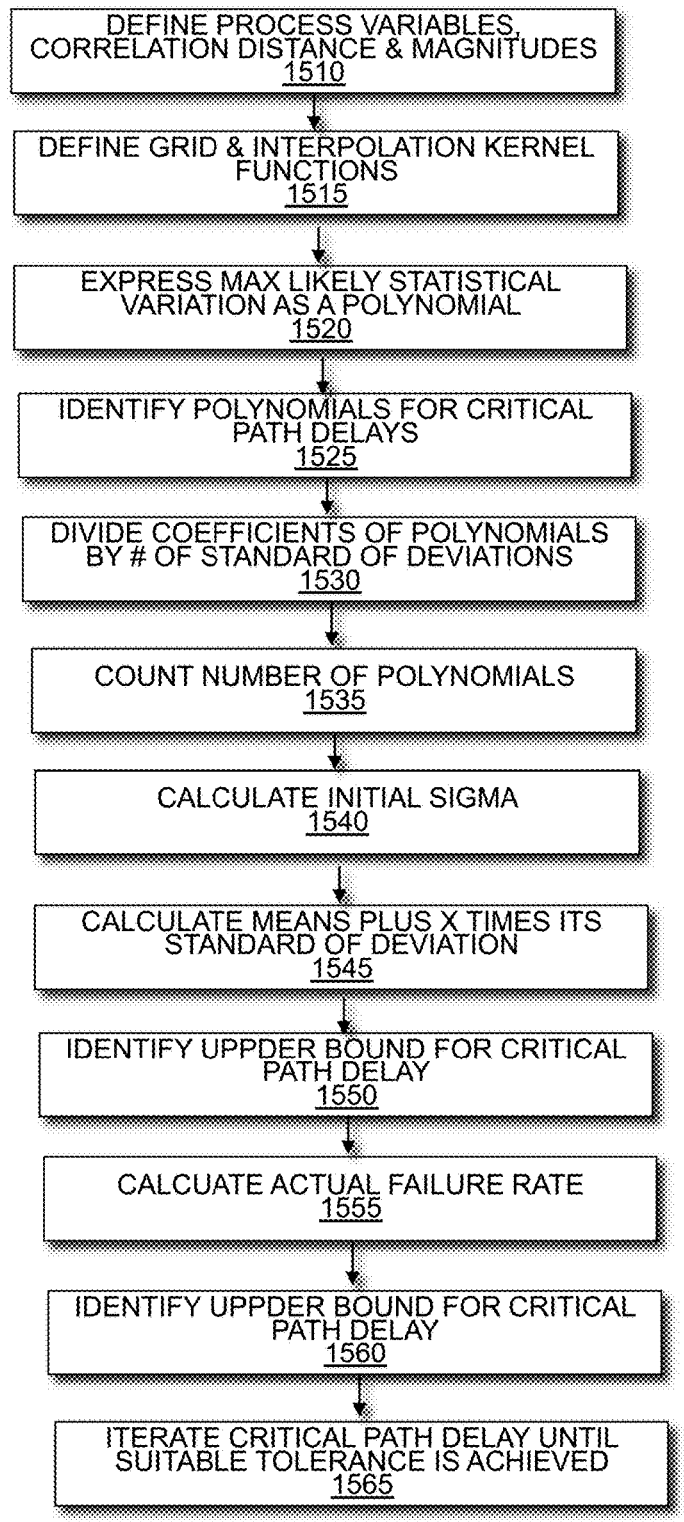
FIG. 15 is a flow chart illustrating a method for performing timing analysis on a system using min/max bounds according to an exemplary embodiment of the present disclosure.

FIG. 15 is a flow chart illustrating a method for performing timing analysis on a system using min/max bounds according to an exemplary embodiment of the present disclosure. The procedures illustrated in FIG. 15 highlight the methodologies described above, and may be used in part to implement procedure 150 shown in FIG. 1. At 1510, process variables, correlation distance, and magnitudes corresponding to variation on a die are defined. The variation on the die may be predicted or observed. It should be appreciated that variables representing other criteria other than process may also be defined and applied to the procedures following 1510.

At 1515, one or more grids and interpolation kernel functions that correspond to a pitch and desired correlation distance are defined.

At 1520, the maximum likely statistical variation is expressed as a polynomial in the underlying process variables.

At 1525, a set of polynomials are created for representing critical path delays. According to an embodiment of the present disclosure, procedures 1325-1350 from FIG. 13 may be performed to implement 1530. However, in place of performing exact min-max pruning at 1350, statistical pruning using RMS sum of coefficients is performed to discard polynomials that are sufficiently unlikely to affect the result.

At 1530, coefficients for each of the polynomials identified at 1525 are divided by a number of standard of deviations assumed at 1520.

At 1535, the number of polynomials identified at 1525 is counted. This number may be designated as N.

At 1540, an initial sigma x is calculated. According to an embodiment of the present disclosure, the initial sigma x is calculated as the inverse Gaussian cumulative distribution function (CDF) of the desired reliability divided by N. The desired reliability may be a number reflecting a tolerable failure rate where the device may actually be slower than the timing analysis determines.

At 1545, for each polynomial, its mean plus initial sigma x is multiplied by its standard of deviation.

At 1550, an upper bound for critical path delay is identified. According to an embodiment of the present disclosure, the upper bound is defined as the maximum of the values computed at 1545.

At 1555 an actual fail rate is computed. According to an embodiment of the present disclosure, the actual failure rate is computed using an existing upper bound by determining an actual number of standard of deviations for each path, and summing the failure rates.

At 1560, a lower bound for critical path delay is identified. According to an embodiment of the present disclosure, the lower bound is defined as the maximum number of constants in the polynomials identified at 1525.

At 1560, the critical path delay is iterated until a suitable tolerance is achieved. According to an embodiment of the present disclosure, an iterative method such as binary search, Newton-Raphson, or a combination of the approaches may be applied to 1555.

The methodology described with reference to FIGS. 13 and 15 allows timing analysis to model delays be using a plurality of kernel functions which are localized functions that overlap. The kernel functions represent influence that affects a delay for an area on the target device that is a proper subset of a total area of the target device. The influence may relate to spatial variations and include process, temperature, and/or voltage variation.

The kernel functions may be identified by defining a set of process or other type of delay variation variables, correlation distances, and magnitudes corresponding to the variation on the target device. Polynomial coefficients associated with a location on the target device may be identified by utilizing the kernel functions. Delays that cannot form a minimum or maximum value may be removed as described with reference to FIG. 13. Alternatively, an RMS of a difference of delays may be computed, and polynomials that do not affect the RMS of the difference of the delays to a predetermined probability may be removed as described with reference to FIG. 15.

FIGS. 1, 13, and 15 are flow charts that illustrate embodiments of the present disclosure. The procedures described in these figures may be performed by an EDA tool implemented by a computer system. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 16:
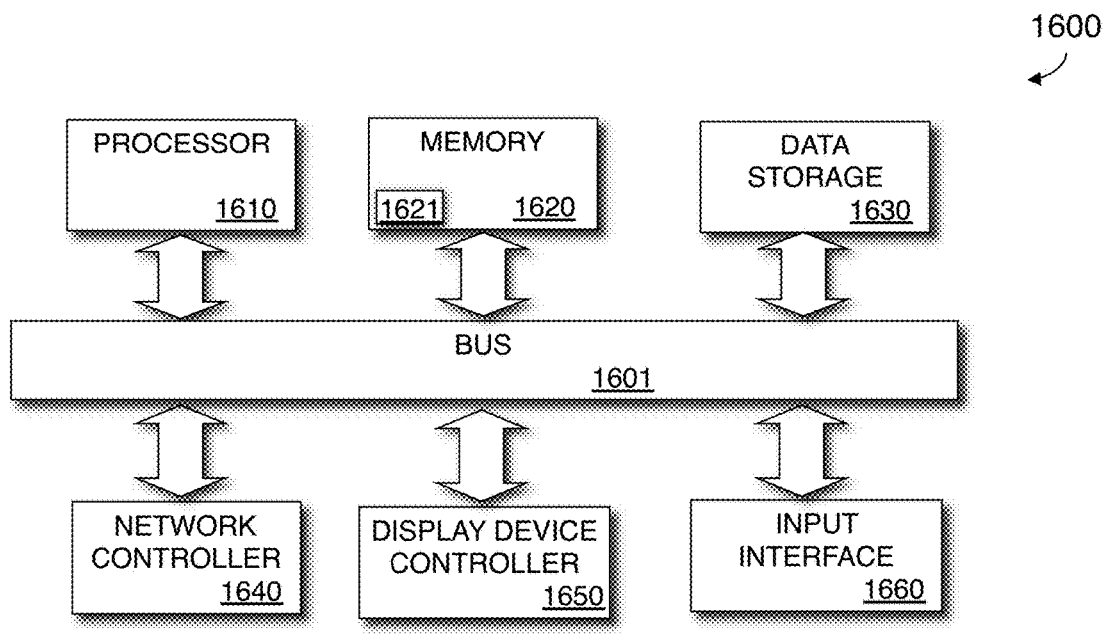
FIG. 16 illustrates a block diagram of a computer system implementing a system designer according to an exemplary embodiment of the present disclosure.

FIG. 16 is a block diagram of an exemplary computer system 1600 in which an example embodiment of the present disclosure resides. The computer system 1600 includes a processor 1610 that process data signals. The processor 1610 is coupled to a bus 1601 or other switch fabric that transmits data signals between processor 1610 and other components in the computer system 1600. The computer system 1600 includes a memory 1620. The memory 1620 may store instructions and code represented by data signals that may be executed by the processor 1610. A data storage device 1630 is also coupled to the bus 1601.

A network controller 1640 is coupled to the bus 1601. The network controller 1640 may link the computer system 1600 to a network of computers (not shown) and supports communication among the machines. A display device controller 1650 is coupled to the bus 1601. The display device controller 1650 allows coupling of a display device (not shown) to the computer system 1600 and acts as an interface between the display device and the computer system 1600. An input interface 1660 is coupled to the bus 1601. The input interface 1660 allows coupling of an input device (not shown) to the computer system 1600 and transmits data signals from the input device to the computer system 1600.

A system designer 1621 may reside in the memory 1620 and be executed by the processor 1610. The system designer 1621 may operate to perform synthesis, placement, routing, and timing analysis on a design for the system. According to an embodiment of the present disclosure, timing analysis is performed on a placed system to model delays by using a plurality of localized functions that overlap. The localized functions represent an influence that affects a delay for an area on the target device that is a proper subset of a total area of the target device. The influence may relate to one or more of process, temperature, and voltage variation.

Figure 17:
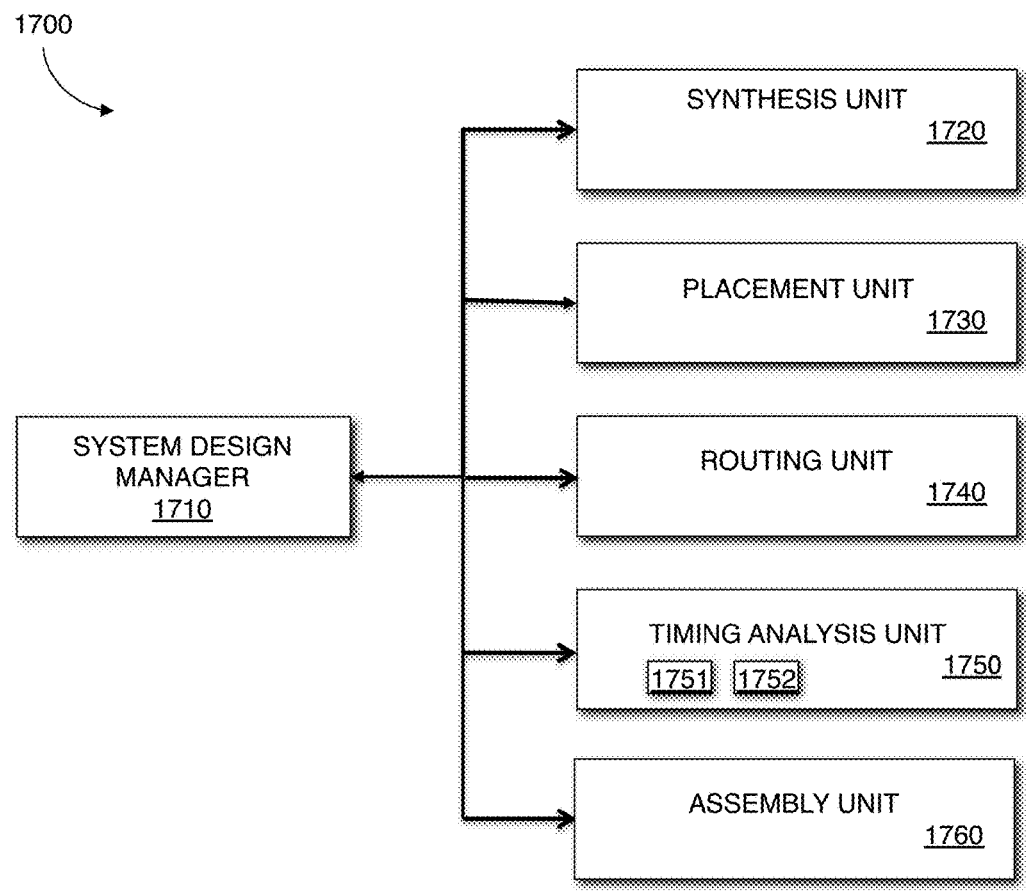
FIG. 17 is a block diagram of a system designer according to an exemplary embodiment of the present disclosure.

FIG. 17 illustrates a system designer 1700 according to an embodiment of the present disclosure. The system designer 1700 may be an EDA tool for designing a system on a target device such as an FPGA, structured application-specific integrated circuit (ASIC), ASIC, or other circuitry. FIG. 17 illustrates modules implementing an embodiment of the system designer 1700. According to one embodiment, the modules represent software modules and system design may be performed by a computer system such as the one illustrated in FIG. 16 executing sequences of instructions represented by the modules shown in FIG. 17. Execution of the sequences of instructions causes the computer system to support system design as will be described hereafter. In alternate embodiments, hard-wire circuitry may be used in place of or in combination with software instructions to implement embodiments of present disclosure. Thus, embodiments of present disclosure are not limited to any specific combination of hardware circuitry and software.

The system designer 1700 includes a designer manager 1710. The designer manager 1710 is connected to and transmits data between the components of the system designer 1700.

The system designer 1700 includes a synthesis unit 1720. The synthesis unit 1720 takes a conceptual HDL design definition and generates an optimized logical representation of the system. The optimized logical representation of the system generated by the synthesis unit 1720 may include a representation that has a reduced number of functional blocks and registers, such as logic gates and logic elements, required for the system. Alternatively, the optimized logical representation of the system generated by the synthesis unit 1720 may include a representation that has a reduced depth of logic and that generates a lower signal propagation delay.

The synthesis unit 1720 also performs technology mapping. Technology mapping involves determining how to implement the functional blocks and registers in the optimized logic representation utilizing specific resources such as cells on a target device thus creating an optimized "technology-mapped" netlist. The technology-mapped netlist illustrates how the resources (cells) on the target device are utilized to implement the system. In an embodiment where the target device is an FPGA, the technology-mapped netlist may include cells such as logic array blocks (LABs), registers, memory blocks, digital signal processing (DSP) blocks, input output (IO) elements or other components.

The system designer 1700 includes a placement unit 1730 that processes the optimized technology-mapped netlist to produce a placement for each of the functional blocks. The placement identifies which components or areas on the target device are to be used for specific functional blocks and registers.

The system designer 1700 includes a routing unit 1740 that determines the routing resources on the target device to use to provide interconnection between the components implementing functional blocks and registers of the logic design.

The system designer 1700 includes a timing analysis unit 1750 that performs timing analysis to determine whether timing constraints of the system are satisfied. The timing analysis unit 1750 may model variations on a die such that elements located near each other are modeled having similar delays. In one embodiment, a variation on the die may be modeled as a set of process variables. The delay of each circuit element may be modeled as a polynomial in the process variables. The polynomial may model a contribution of a process variation across the die for each circuit element. It should be appreciated that the timing analysis may be performed during and/or after each of the synthesis, placement, and routing procedures to guide compiler optimizations.

According to an embodiment of the present disclosure, the timing analysis unit 1750 performs timing analysis to model delay on the system by using a plurality of localized functions that overlap. The localized functions may represent an influence that affects the delay for an area on the target device that is a proper subset of a total area of the target device. The timing analysis unit 1750 includes a localized function identifier 1751 that identifies the localized functions by defining a set of process variables, correlation distances, and magnitudes corresponding to variation on the target device. The timing analysis unit 1750 also includes a polynomial coefficients unit 1752 that identifies polynomial coefficients associated with a location on the target device by utilizing the localized functions.

The system designer includes an assembly unit 1760 that performs an assembly procedure that creates a data file that includes the design of the system. The data file may be a bit stream that may be used to program the target device. The assembly unit 1760 may output the data file so that the data file may be stored or alternatively transmitted to a separate machine used to program the target device. It should be appreciated that the assembly unit 1760 may also output the design of the system in other forms such as on a display device or other medium.

It should be appreciated that embodiments of the present disclosure may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 18:
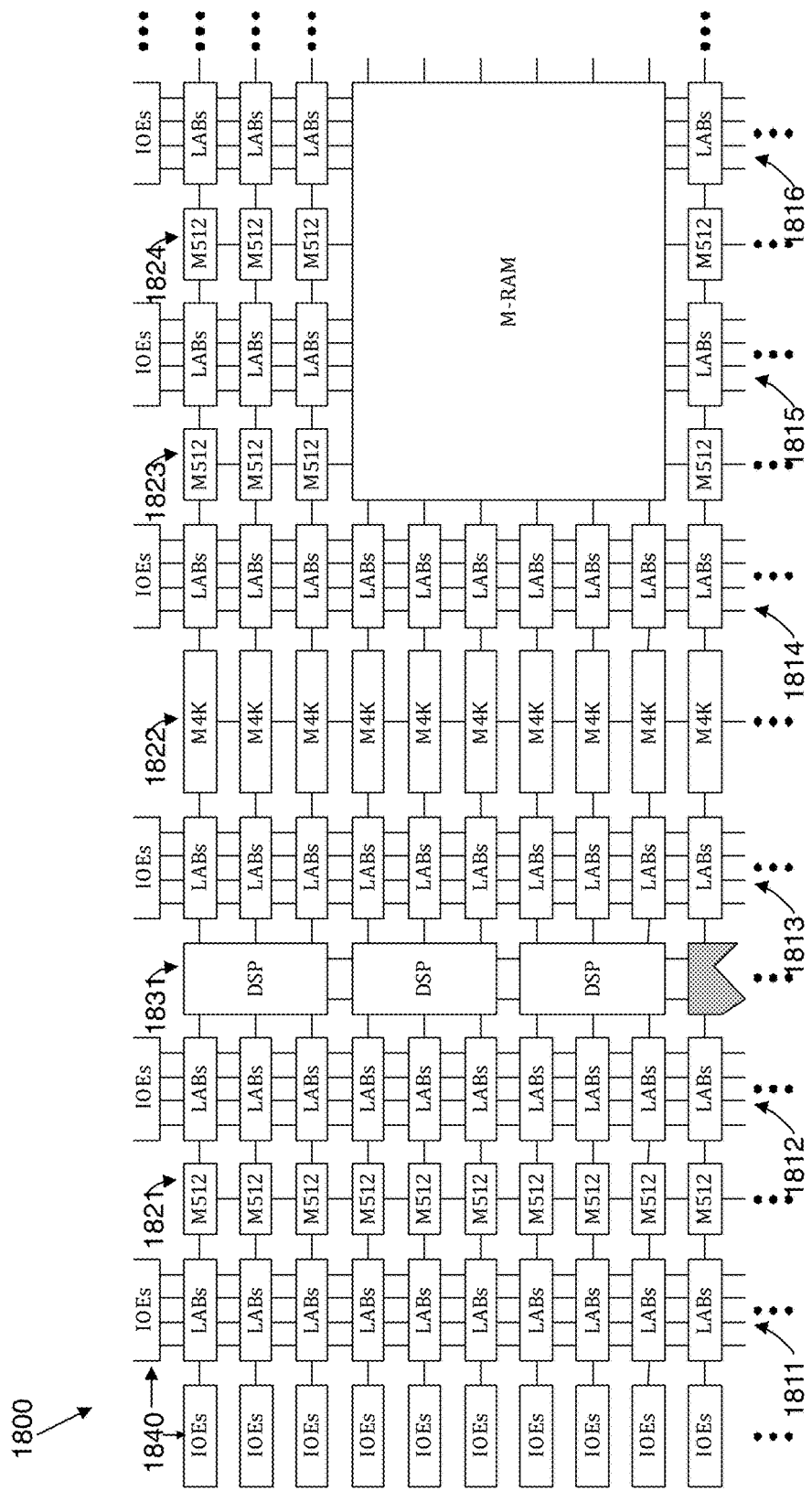
FIG. 18 illustrates an exemplary target device according to an exemplary embodiment of the present disclosure.

FIG. 18 illustrates a device 1800 that may be used to implement a target device according to an embodiment of the present disclosure. The device may be implemented on a die, as discussed above. The device 1800 is a field programmable gate array (FPGA) that includes a plurality of logic-array blocks (LABs). According to an embodiment of the present disclosure, the device 1800 may be implemented on a single integrated circuit. Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present disclosure, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present disclosure, the logic block may operate similarly to an adaptive logic module (ALM), such as those found in Stratix devices manufactured by Altera Corporation. LABs are grouped into rows and columns across the device 1800. Columns of LABs are shown as 1811-1816. It should be appreciated that the logic block may include additional or alternate components.

The device 1800 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1800. Columns of memory blocks are shown as 1821-1824.

The device 1800 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1800 and are shown as 1831.

The device 1800 includes a plurality of input/output elements (IOEs) 1840. Each IOE feeds an IO pin (not shown) on the device 1800. The IOEs 1840 are located at the end of LAB rows and columns around the periphery of the device 1800. Each IOE may include a bidirectional IO buffer and a plurality of registers for registering input, output, and output-enable signals.

The device 1800 may include routing resources such as LAB local interconnect lines, row interconnect lines ("H-type wires"), and column interconnect lines ("V-type wires") (not shown) to route signals between components on the target device.

In the foregoing specification, embodiments of the disclosure have been described with reference to specific exemplary embodiments thereof. It will, however, be evident that various modifications and changes may be made thereto without departing from the broader spirit and scope of the embodiments of the disclosure. The specification and drawings are, accordingly, to be regarded in an illustrative rather than restrictive sense.

What is claimed is:

1. A method for designing a system on a target device, comprising:
   placing the system on the target device;
   performing timing analysis on the placed system to model delays by using a plurality of localized functions that overlap to represent an influence that affects a delay for an area on the target device that is a proper subset of a total area of the target device, wherein each of the plurality of localized functions cover less than a total area of the target device;
   generating a program file that includes a design of the system that is placed and timing analyzed; and
   programming the target device with the program file to transform programmable resources on the target device to implement the design, wherein the target device is implemented on an integrated circuit.

2. The method of claim 1, wherein the influence relates to process variation.

3. The method of claim 1, wherein the influence relates to a combination of process, temperature, and voltage variation on the target device.

4. The method of claim 1, wherein performing timing analysis comprises identifying the plurality of localized functions by defining a set of process variables, correlation distances, and magnitudes corresponding to variation on the target device.

5. The method of claim 1 further comprising identifying polynomial coefficients associated with a location on the target device by utilizing the localized functions.

6. The method of claim 5 further comprising removing delays that cannot form a minimum or maximum value.

7. The method of claim 5 further comprising:
   computing a root means square (RMS) of a difference of the delays; and
   removing polynomials that do not affect the RMS of the difference of the delays to a predetermined probability.

8. The method of claim 1, wherein the timing analysis is performed prior to routing.

9. The method of claim 1, wherein each of the plurality of localized functions are used together, collectively during the timing analysis.

10. The method of claim 1, wherein using the plurality of localized functions is performed prior to routing.

11. The method of claim 1 further comprising transmitting the program file to the target device.

12. A non-transitory computer readable medium including a sequence of instructions stored thereon for causing a computer to execute a method for designing a system on a target device, comprising:
   placing the system on the target device;
   performing timing analysis on the placed system to model delays by using a plurality of localized functions that overlap to represent an influence that affects a delay for an area on the target device that is a proper subset of a total area of the target device, wherein each of the plurality of localized functions cover less than a total area of the target device;
   generating a program file that includes a design of the system that is placed and timing analyzed; and
   programming the target device with the program file to transform programmable resources on the target device to implement the design, wherein the target device is implemented on an integrated circuit.

13. The non-transitory computer readable medium of claim 12, wherein the influence relates to process variation.

14. The non-transitory computer readable medium of claim 12, wherein the influence relates to a combination of process, temperature, and voltage variation on the target device.

15. The non-transitory computer readable medium of claim 12, wherein performing timing analysis comprises identifying the plurality of localized functions by defining a set of process variables, correlation distances, and magnitudes corresponding to variation on the target device.

16. The non-transitory computer readable medium of claim 15 further comprising identifying polynomial coefficients associated with a location on the target device by utilizing the localized functions.

17. The non-transitory computer readable medium of claim 16 further comprising removing delays that cannot form a minimum or maximum value.

18. The non-transitory computer readable medium of claim 16 further comprising:
   computing a root means square (RMS) of a difference of the delays; and
   removing polynomials that do not affect the RMS of the difference of the delays to a predetermined probability.

19. The non-transitory computer readable medium of claim 12, wherein the timing analysis is performed prior to routing.

20. A system designer, comprising:
   a placement unit that places a system on a target device;
   a timing analysis unit that performs timing analysis to model delay on the system that is placed by using a plurality of localized functions that overlap to represent an influence that affects a delay for an area on the target device that is a proper subset of a total area of the target device, wherein each of the plurality of localized functions cover less than a total area of the target device, and wherein at least one of the placement unit and the timing analysis unit is implemented by a processor; and
   an assembly unit that generates a data file that includes a design of the system that is placed and timing analyzed and programs the target device with the data file to transform programmable resources on the target device to implement the design, wherein the target device is implemented on an integrated circuit.

21. The system designer of claim 20, wherein the timing analysis unit comprises a localized function identifier that identifies the localized functions by defining a set of process variables, correlation distances, and magnitudes corresponding to variation on the target device.

22. The system designer of claim 20, wherein the timing analysis unit comprises a polynomial coefficients unit that identifies polynomial coefficients associated with a location on the target device by utilizing the localized functions.

23. The system designer of claim 20, wherein the timing analysis is performed prior to routing.

* * * * *